US006784957B2

(12) United States Patent
Kanou et al.

(10) Patent No.: US 6,784,957 B2
(45) Date of Patent: Aug. 31, 2004

(54) LIQUID CRYSTAL DISPLAY APPARATUS WITH PROTECTIVE INSULATING FILM FOR SWITCHING ELEMENT AND PRODUCTION METHOD THEREOF

(75) Inventors: Hiroshi Kanou, Tokyo (JP); Yuichi Yamaguchi, Tokyo (JP); Hironori Kikkawa, Tokyo (JP)

(73) Assignees: NEC Corporation, Tokyo (JP); NEC LCD Technologies, Ltd., Kanagawa (JP)

( * ) Notice: Subject to any disclaimer, the term of this patent is extended or adjusted under 35 U.S.C. 154(b) by 219 days.

(21) Appl. No.: 09/756,874

(22) Filed: Jan. 10, 2001

(65) Prior Publication Data

US 2004/0070709 A1 Apr. 15, 2004

(30) Foreign Application Priority Data

Jan. 14, 2000 (JP) ........................................ 2000-006423

(51) Int. Cl.[7] ...................... G02F 1/1333; G02F 1/1335
(52) U.S. Cl. .......................... 349/113; 349/138; 438/30
(58) Field of Search ................................. 349/113, 130; 359/857; 438/30

(56) References Cited

U.S. PATENT DOCUMENTS

| 5,408,345 | A | | 4/1995 | Mitsui et al. | |
|---|---|---|---|---|---|
| 5,500,750 | A | | 3/1996 | Kanbe et al. | |
| 5,610,741 | A | * | 3/1997 | Kimura | 349/113 |
| 5,691,791 | A | * | 11/1997 | Nakamura et al. | 349/113 |
| 5,990,995 | A | * | 11/1999 | Ebihara et al. | 349/113 |
| 6,108,064 | A | * | 8/2000 | Minoura et al. | 349/130 |
| 6,259,500 | B1 | * | 7/2001 | Kijima et al. | 349/113 |

FOREIGN PATENT DOCUMENTS

| JP | 61-6390 B2 | 2/1986 |
|---|---|---|
| JP | 61-6390 | 2/1986 |
| JP | 2-230126 A | 9/1990 |
| JP | 6-27481 A | 2/1994 |
| JP | 6-75238 A | 3/1994 |
| JP | 8-101383 A | 4/1996 |
| JP | 9-90426 A | 4/1997 |
| JP | 10-10525 A | 1/1998 |
| JP | 10-111502 A | 4/1998 |
| JP | 10-311982 A | 11/1998 |
| JP | 11-258617 A | 9/1999 |

OTHER PUBLICATIONS

T. Koizumi et al., "Reflective Multicolor LCD (II): Improvement in the Brightness", Proceedings of the SID, vol. 29, 157, (1988) with Abstract.

* cited by examiner

*Primary Examiner*—Huyen Ngo
(74) *Attorney, Agent, or Firm*—Sughrue Mion, PLLC

(57) ABSTRACT

The present invention provides a reflective liquid crystal display (LCD) apparatus including a glass substrate 53, a transparent electrode 55 arranged on the glass substrate, a glass substrate 40, a thin film transistor (TFT) 44 arranged on the glass substrate 40, an insulation film 45 arranged on the TFT 44 and having a convex/concave structure 45a on its surface, a reflection electrode 48 arranged along the convex/concave structure 45a and connected to the TFT 44, and a liquid crystal layer 56 sandwiched between the transparent electrode 55 and the reflection electrode 48. The insulation film 48 protects the TFT transistor 44 after being formed and has the convex/concave structure 45a formed irregular arrangement of regions having different film thickness values. Thus, it is possible to prevent deterioration of the switching element during the production as well as to reduce the number of production steps.

33 Claims, 38 Drawing Sheets

FIG.2(a)
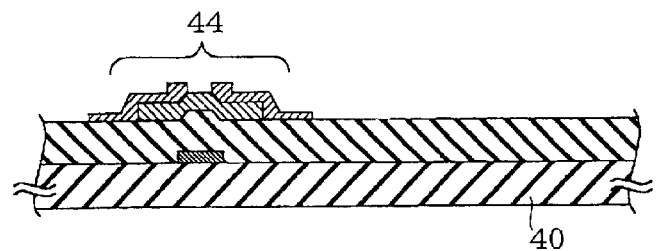
FIG.2(b),(c)
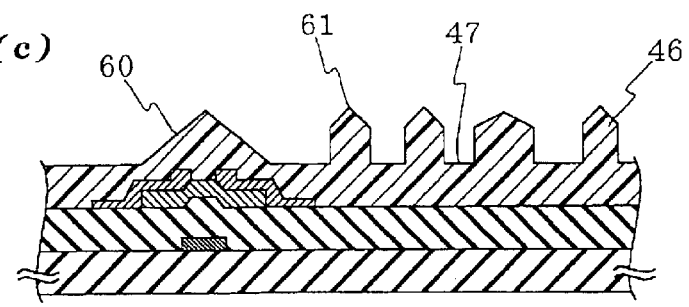
FIG.2(d)
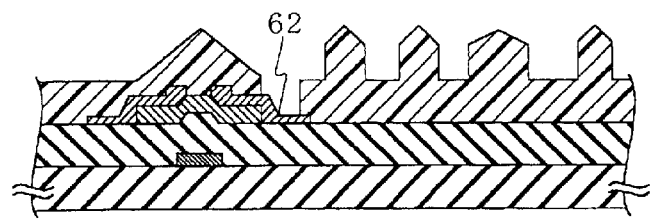
FIG.2(e)
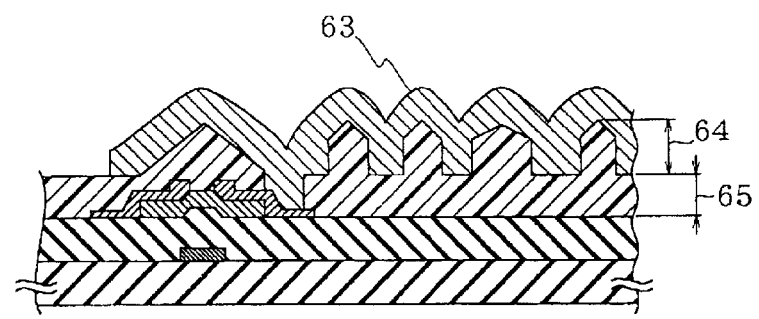

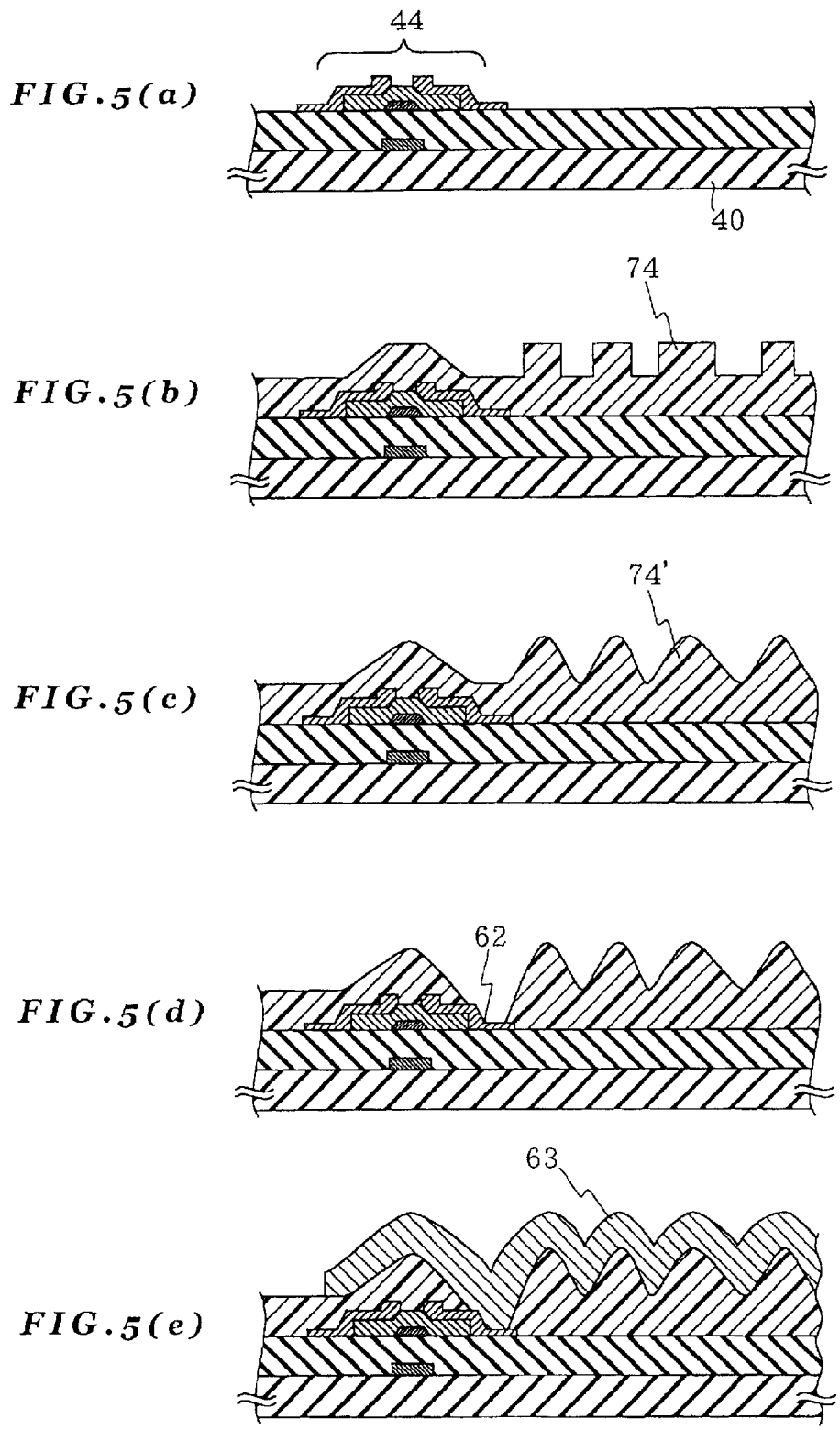

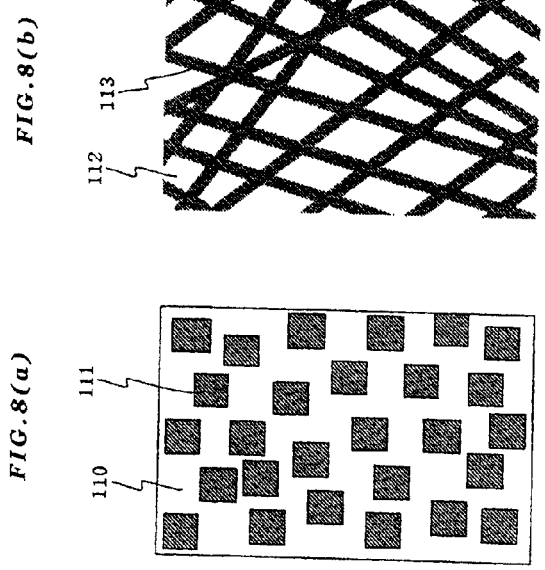

REFLECTIVE LIQUID CRYSTAL DISPLAY APPARATUS

SEMI-TRANSPARENT LIQUID CRYSTAL DISPLAY APPARATUS

FIG.14(a),(b)
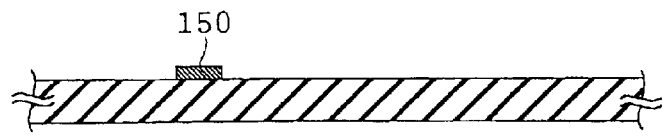
FIG.14(c),(d)
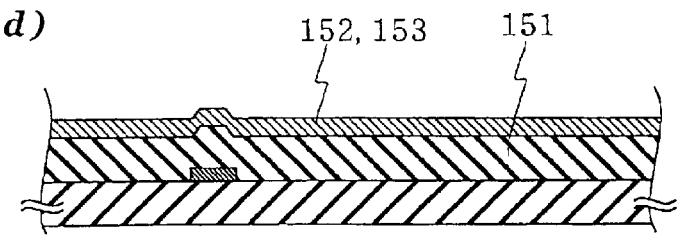
FIG.14(e)
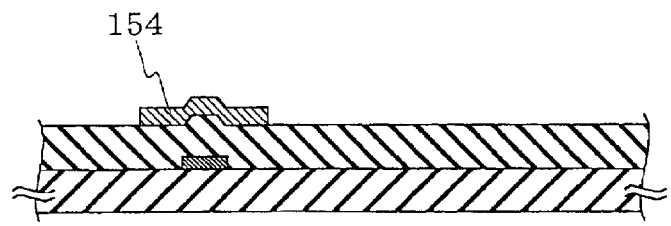
FIG.14(f)
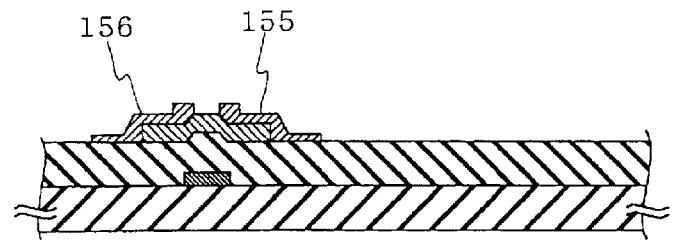
FIG.14(g)
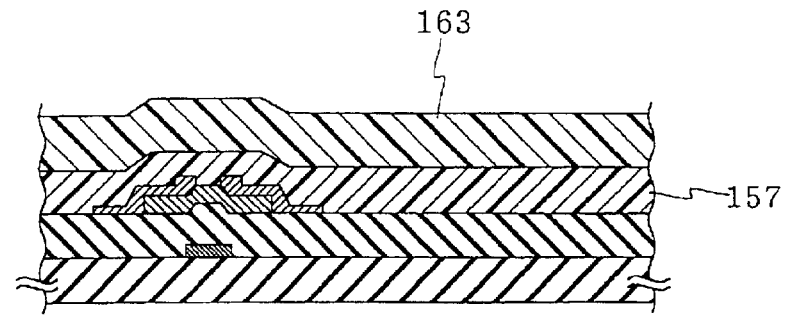

FIG.15(h),(i)
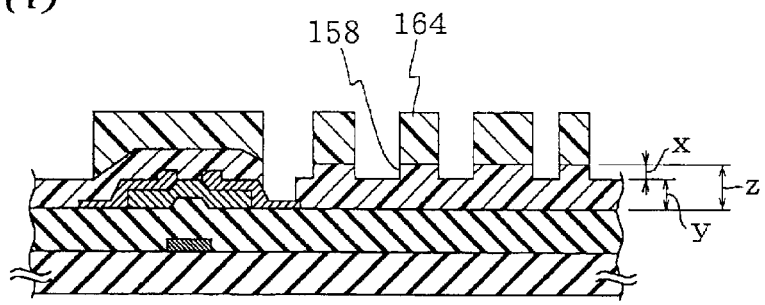
FIG.15(j)
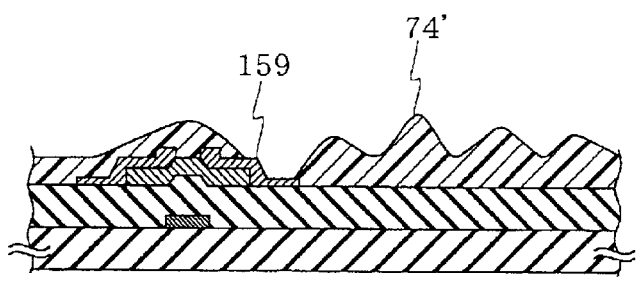
FIG.15(k)
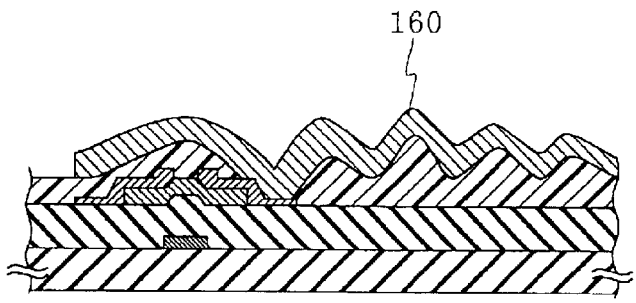

*FIG.18(a),(b)*
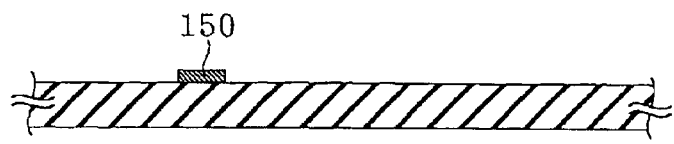
*FIG.18(c),(d)*
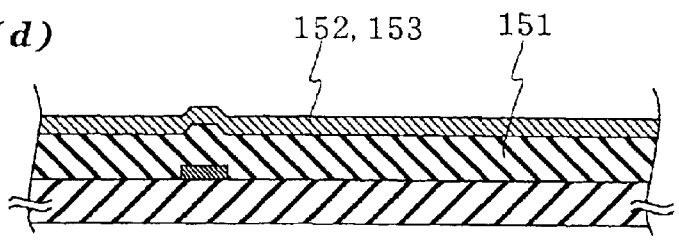
*FIG.18(e)*
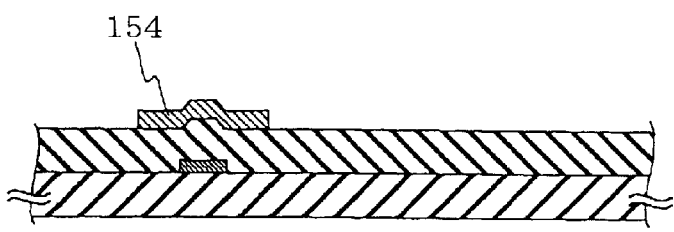
*FIG.18(f)*
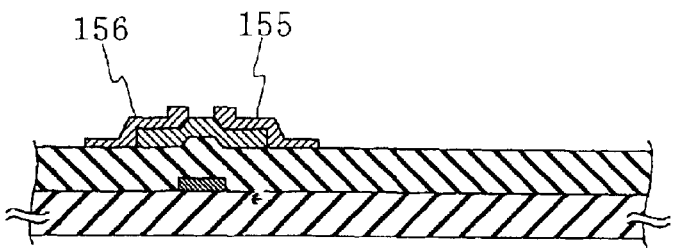
*FIG.18(g)*
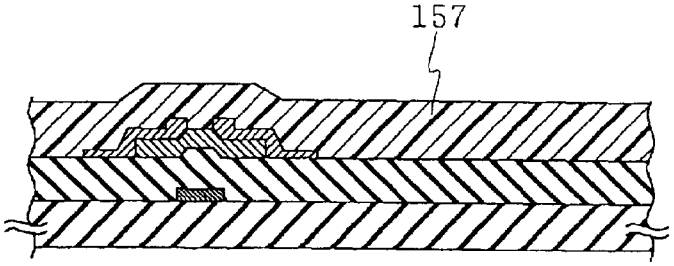

FIG.19(h),(i)
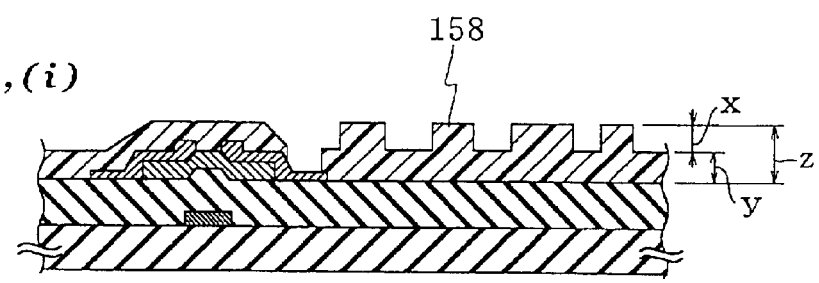
FIG.19(j)
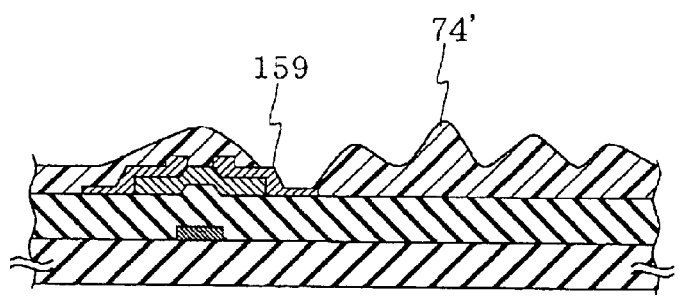
FIG.19(k)
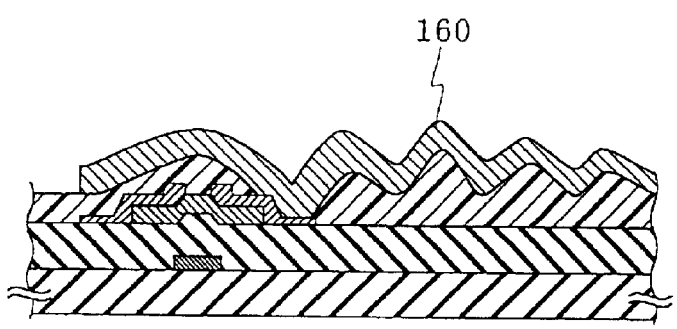

FIG.20(a),(b),(c),(d),(e),(f)
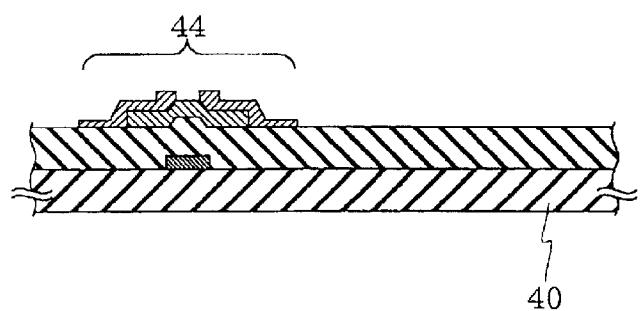
FIG.20(g)
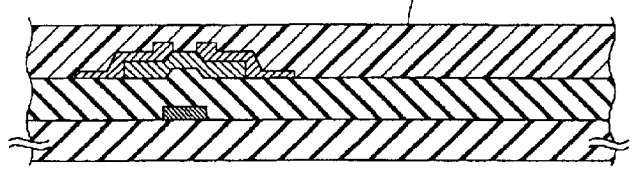
FIG.20(h)
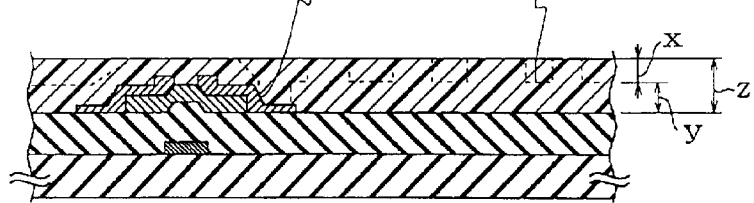

FIG.22(a),(b)
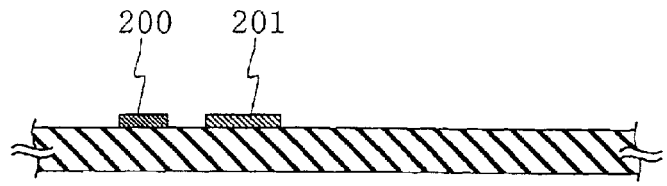
FIG.22(c),(d)
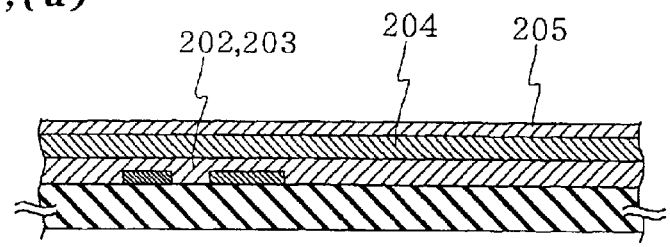
FIG.22(e)
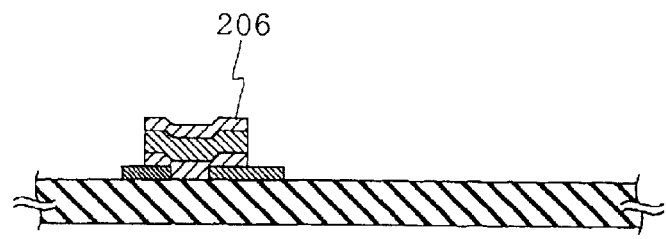
FIG.22(f)
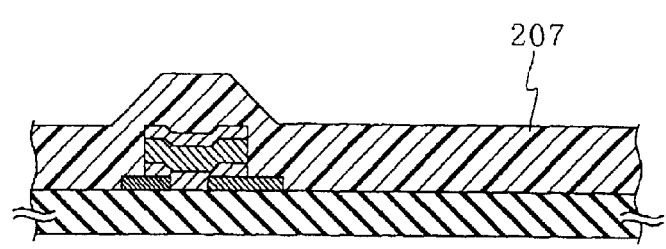

FIG.23(g)
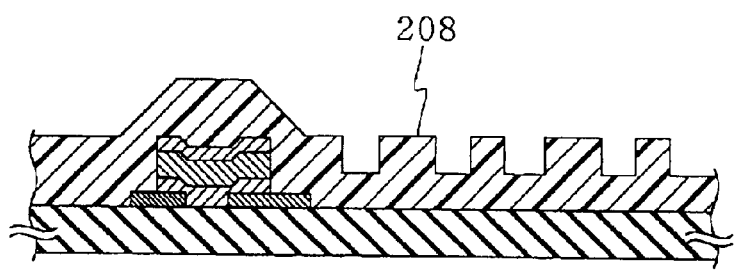
FIG.23(h)
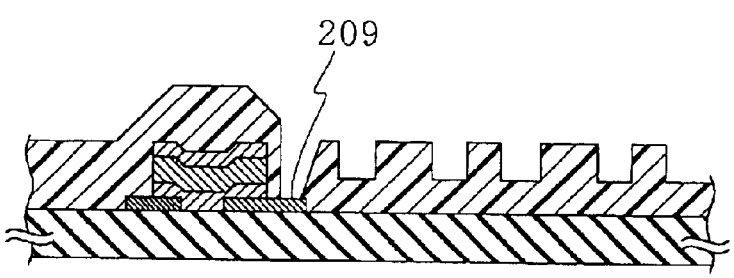
FIG.23(i),(j)
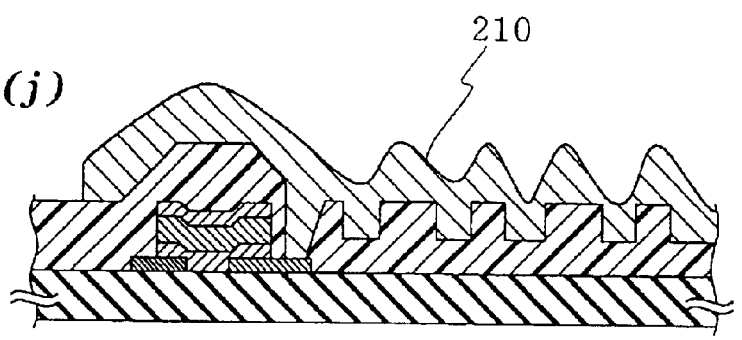

FIG.25(a),(b)
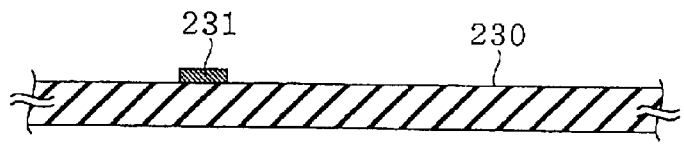
FIG.25(c)
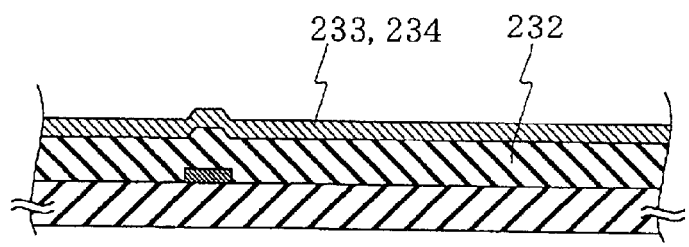
FIG.25(d)
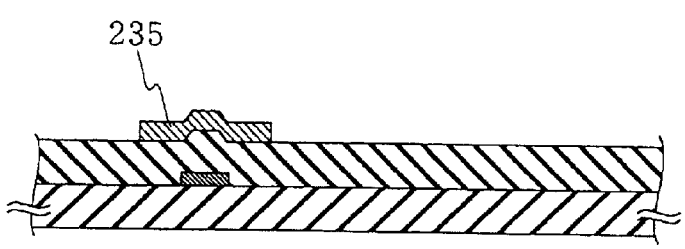
FIG.25(e),(f)
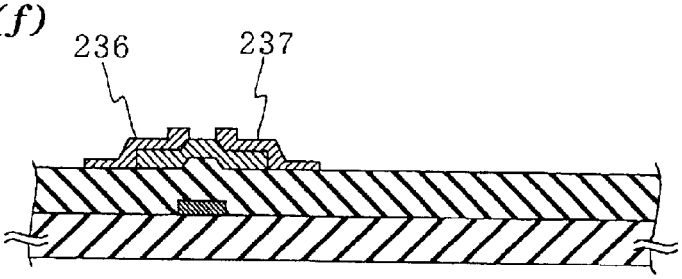
FIG.25(g)
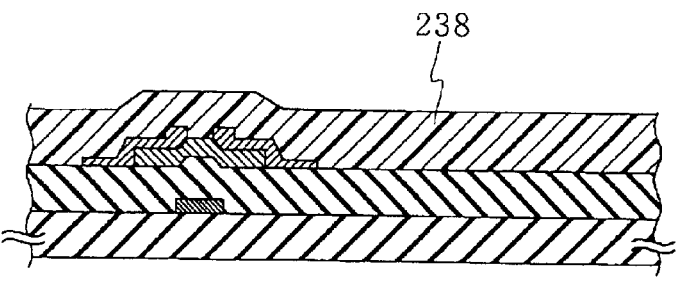

FIG.26(h)
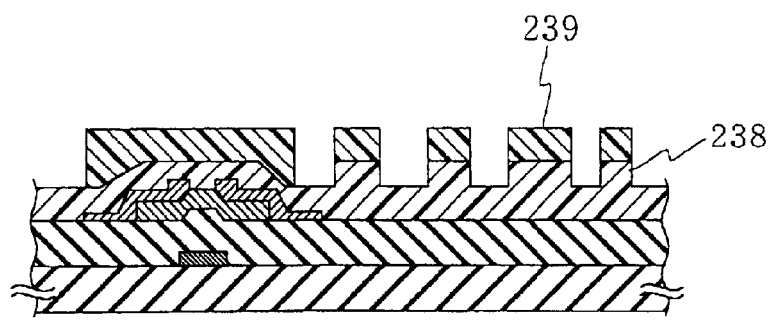
FIG.26(i)
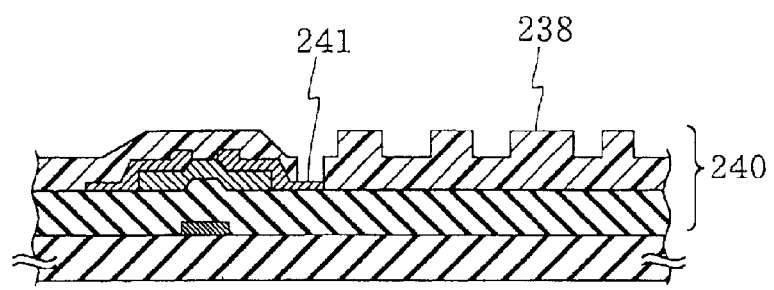
FIG.26(j),(k),(l)
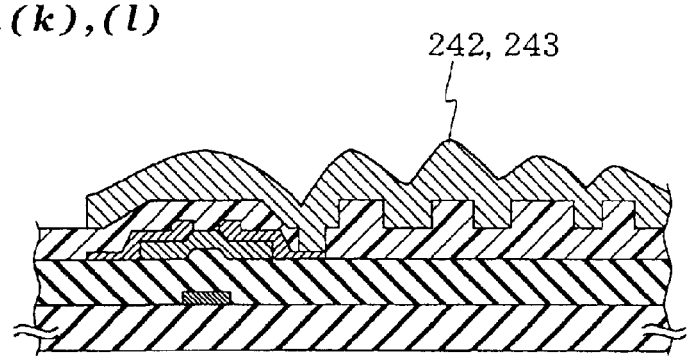

*FIG.28(a),(b)*
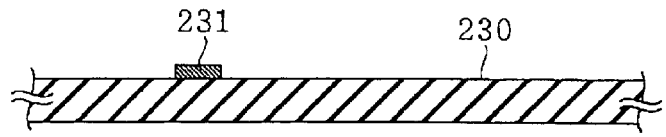
*FIG.28(c)*
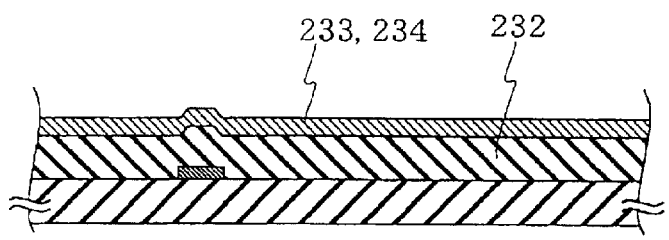
*FIG.28(d)*
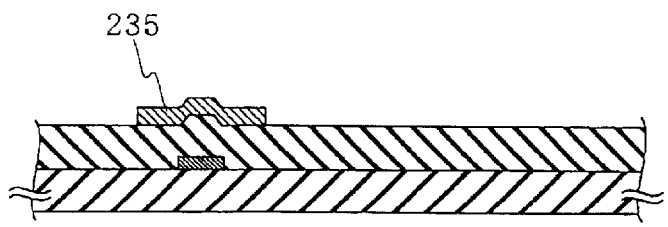
*FIG.28(e),(f)*
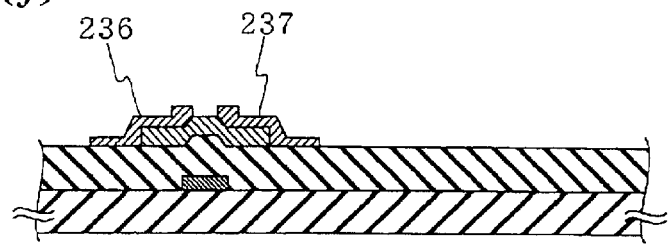
*FIG.28(g)*
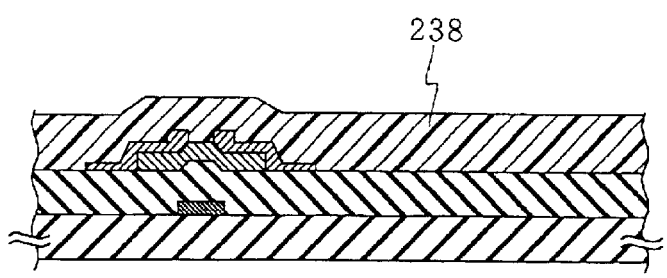

FIG.29(h)
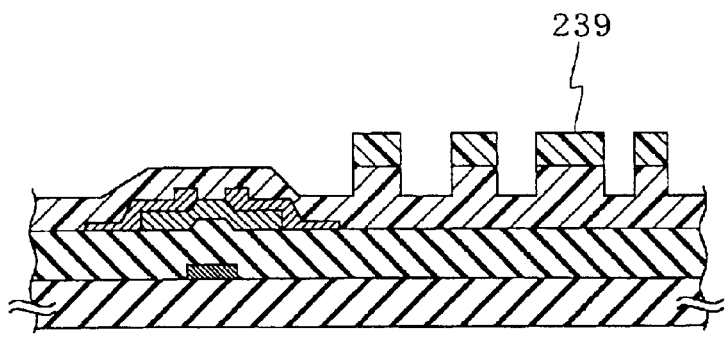
FIG.29(i)
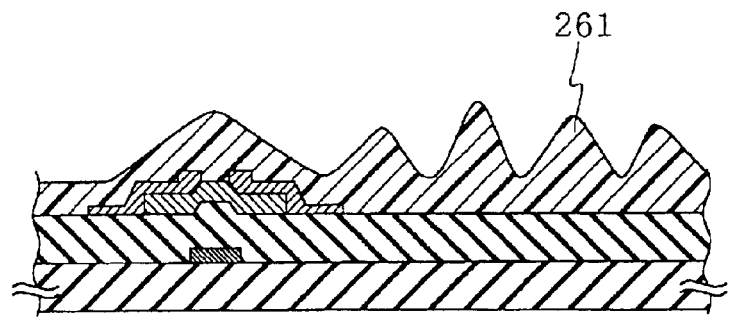
FIG.29(j)
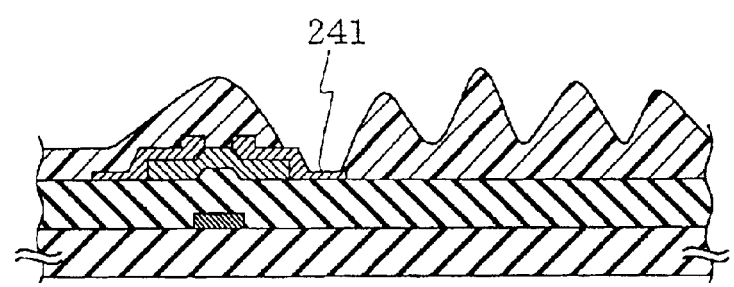
FIG.29(k), (l)
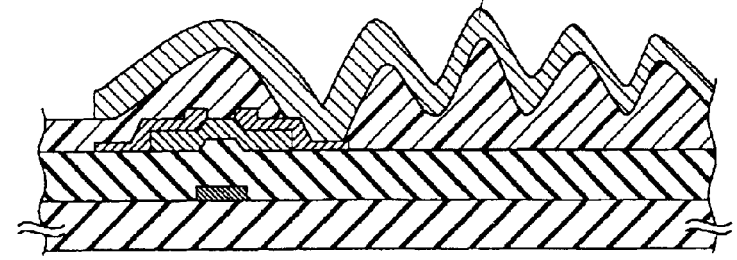

FIG.30(a),(b)
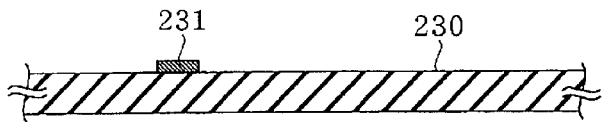
FIG.30(c)
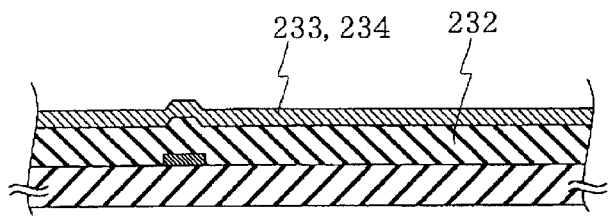
FIG.30(d)
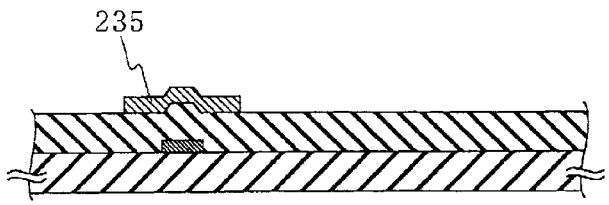
FIG.30(e),(f)
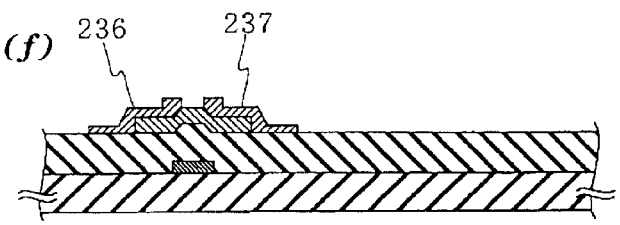
FIG.30(g)
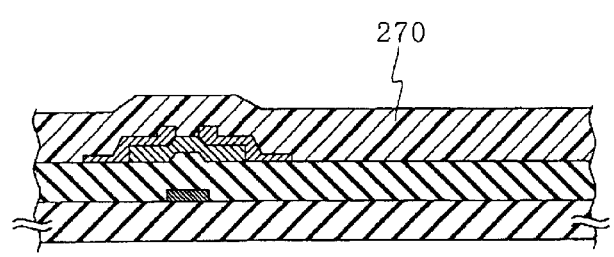

FIG.31(h)
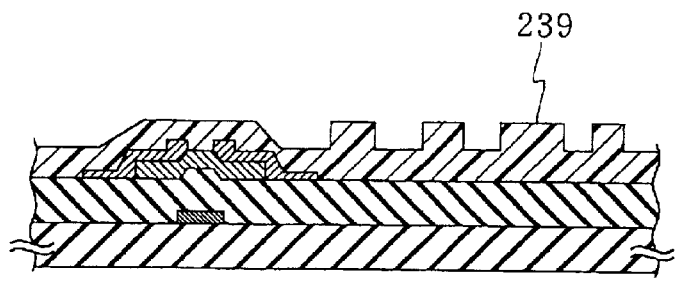
FIG.31(i)
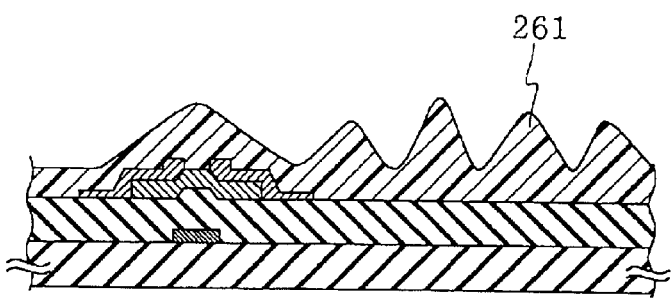
FIG.31(j)
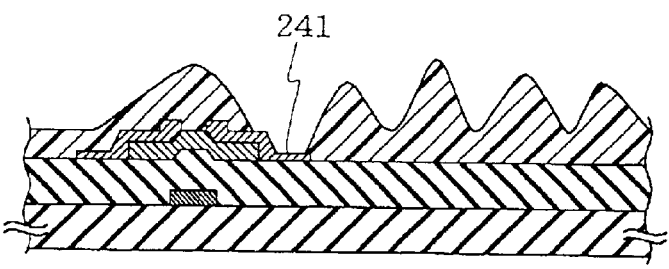
FIG.31(k), (l)
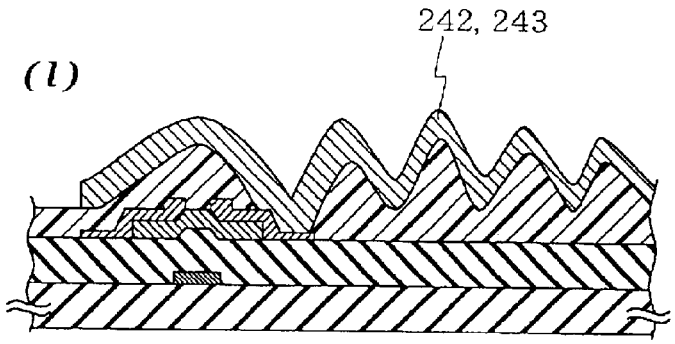

FIG.32(a),(b)
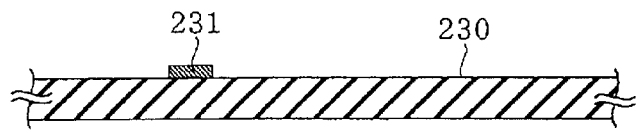
FIG.32(c)
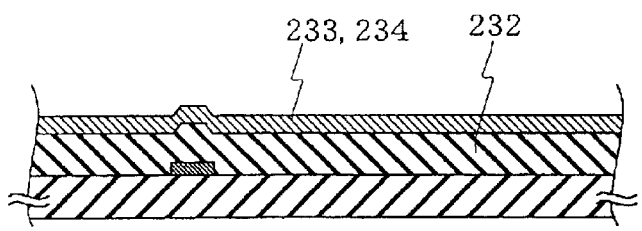
FIG.32(d)
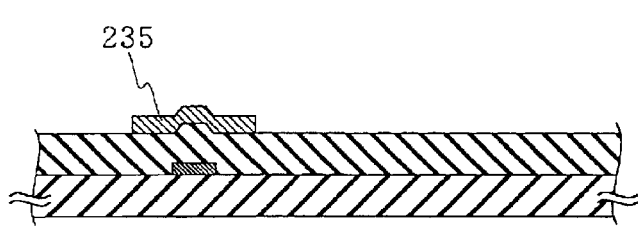
FIG.32(e),(f)
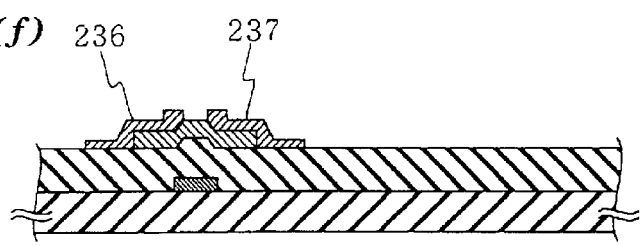
FIG.32(g)
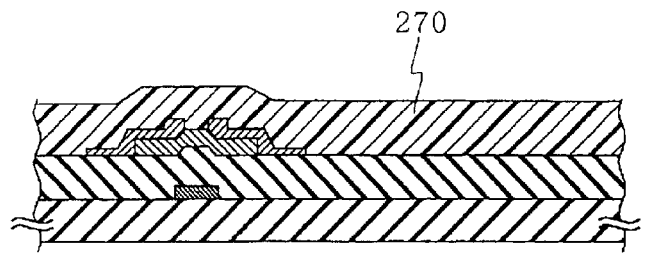

FIG.33(h)
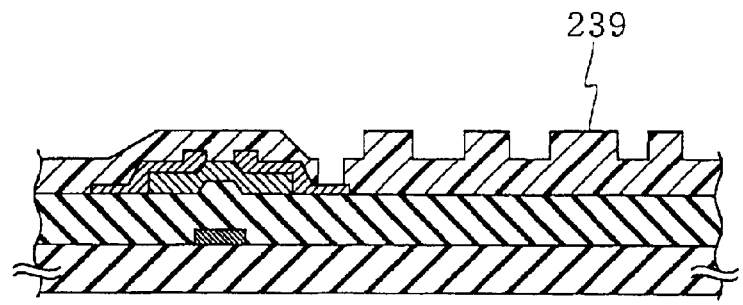
FIG.33(i)
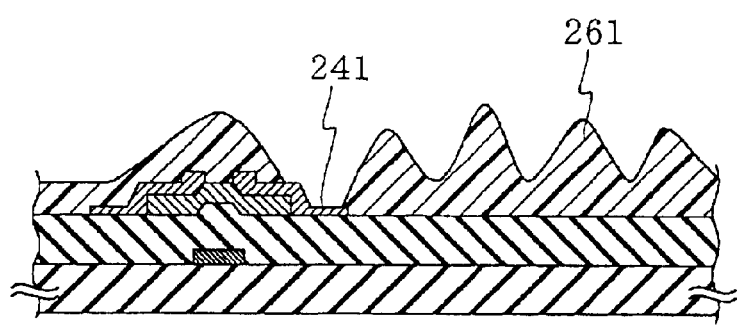
FIG.33(j),(k),(l)
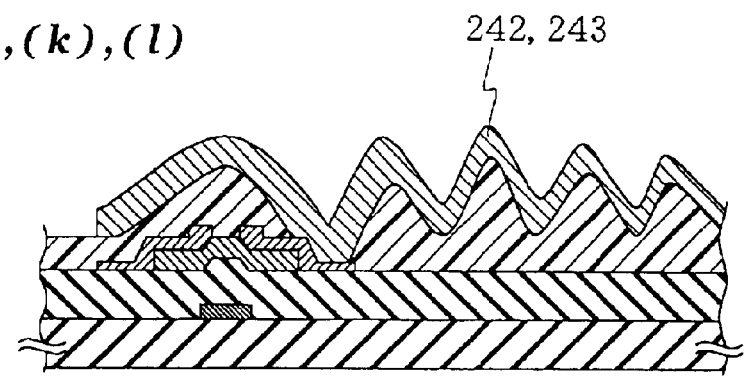

FORMING GATE
ELECTRODE (1PR)

FORMING INSUKATION FILM
AND SEMICONDUCTOR FILM

FORMING SEMICONDUCTOR
PATTERN FILM
(3PR)

FORMING SOURSE
ELECTRODE AND
DRAIN ELECTRODE
(3PR)

FORMING ORGANIC
INSULATION FILM

FORMING CONVEX/
CONCAV STRUCTURE
(4PR)

MELTING CONVEX/
CONCAVE STRUCTURE

FORMING INSULATION
LAYER

FORMING CONTACT REGION
(5PR)

FORMING REFLECTITION
PIXEL ELECTRODE
(6PR)

LIQUID CRYSTAL DISPLAY APPARATUS WITH PROTECTIVE INSULATING FILM FOR SWITCHING ELEMENT AND PRODUCTION METHOD THEREOF

BACKGROUND OF THE INVENTION

1. Field of the Invention

The present invention relates to a reflective liquid crystal display (LCD) apparatus having a reflection plate for reflecting to outside a light which has passed through a liquid crystal layer from outside.

2. Description of the Related Art

As compared to a transmitting LCD apparatus, a reflective LCD apparatus can reach a reduced power consumption and a thin type with a reduced weight and accordingly, has been used mainly in a portable terminal. In the reflective LCD apparatus, light incident from outside is reflected by a reflection plate in the apparatus so as to be utilized as a display light source, thereby eliminating need of back light.

The conventional reflective LCD apparatus has a basic configuration composed of a liquid crystal of the TN (twisted nematic) type, a single deflection plate type, STN (super twisted nematic) type, GH (guest-host) type, PDLC (high molecule dispersion) type, or cholesteric type, a switching element for driving the liquid crystal, and a reflection plate arranged inside or outside liquid crystal cells. The reflective LCD apparatus utilizes an active matrix drive method capable of realizing a high-resolution and high-quality image by using a thin film transistor (TFT) or metal/insulation film/metal structured diode (MIM) as a switching element, to which a reflection plate is attached.

FIG. 36 is a cross sectional view of a conventional reflective LCD apparatus of a single deflection plate type. Hereinafter, explanation will be given with reference to this figure.

An opposing substrate 1 includes a deflection plate, a phase difference plate 32, a glass substrate 4, a color filter 5, and a transparent electrode 6. A lower substrate 7 includes a glass substrate 8, a thin film transistor (TFT) 9 of an inverse stagger structure as a switching element formed on the glass substrate 8, an insulator protrusion 10 as a base for forming a, a polyimide film 11 as an inter-layer insulation film formed thereon, and a reflection electrode 13 connected to a source electrode 12 of the TFT and functioning as a reflection plate and a pixel electrode. A liquid crystal layer 14 is arranged between the opposing substrate 1 and the lower substrate 7.

A reflected light 16 is utilized as a light source. An incident light 15 from outside passes through the deflection plate 2, the phase difference plate 3, the glass substrate 4, the color filter 5, the transparent electrode 6, and the liquid crystal layer 14, and is reflected by the reflection electrode 13 to become the reflected light 16.

This reflective LCD display apparatus should have a display performance for displaying a bright and white display when the liquid crystal is in the light transmitting state. In order to realize this display performance, it is necessary to effectively eject forward the incident light 15 from various directions. For this, the polyimide film 11 is formed with the convex/concave structure, so that the reflection electrode arranged thereon can have a scattering function. Accordingly, control of the convex/concave structure of the reflection electrode 13 is the important factor in deciding the display performance of the reflective LCD apparatus.

FIG. 37 and FIG. 38 show a production method of a conventional reflective LCD apparatus in cross sectional views. Hereinafter, explanation will be given with reference to these figures.

In the thin film transistor production procedure, firstly, a gate electrode 21 is formed on the glass substrate 20 (FIG. 37[a]). Next, a gate insulation film 22, a semiconductor layer 23, a doping layer 24 are formed (FIG. 37[b]). Next, an island 25 of the semiconductor layer 23 and the doping layer 24 is formed (FIG. 37[c]), and the source electrode 26 and the drawing electrode 27 are formed (FIG. 37[d]). After this, the reflection electrode is formed.

For forming the reflection electrode, firstly, an organic insulation film 28 having photosensitivity is formed (FIG. 37[e]). Then, photolithography is performed to form a protrusion 29 in the reflection electrode forming region (FIG. 37[f]), which is then melted by heating so as to be formed into a smooth protrusion 30 (FIG. 38[g]). Next, the protrusion is covered by an organic insulation film 31 to obtain a further smooth convex/concave surface 32 (FIG. 38[h]). Next, a contact portion 33 is formed for electrically connecting a reflection electrode to a source electrode of the thin film transistor (FIG. 38[i]), and then the reflection electrode 34 is formed (FIG. 38[j]). The method for forming this reflection electrode is disclosed, for example, in Japanese Patent Publication (examined) 61-6390 or in Tohru Koizumi and Tatsuo Uchida, Proceeding of the SID, Vol. 29, 157, 1988.

As has been described above, in the conventional reflective LCD apparatus, the convex/concave structure is formed by organic insulation film or inorganic insulation film having photosensitivity as a base which is covered by an organic insulation film or inorganic insulation film.

However, below the protrusions, there are formed a metal wiring, an electrode, a switching element, and the like, which are exposed to an etching liquid used in the etching procedure for forming the protrusions. As a result, a reaction between the etching liquid and the undercoat film deteriorates characteristic of the switching element and the remaining etching liquid lowers reliability of the switching element.

Moreover, when using an organic insulation film or inorganic insulation film having no photosensitivity for the insulation film below the reflection electrode, a photo resist pattern is formed on the insulation film and dry etching is performed to form a convex pattern. In this case, the undercoat film is exposed to plasma during the etching and the plasma damage deteriorates the characteristic of the switching element.

On the other hand, the conventional method for producing the conventional reflective LCD apparatus requires a number of production steps as has been described above. This increases the production cost, which in turn increases the cost of a reflective LCD apparatus. The reason why the reflective LCD apparatus requires a number of production steps is that a high-performance switching element and a high-performance reflection plate are formed on the same insulation substrate in order to obtain a bright high-quality display, and that the production of the high-performance reflection plate requires a method capable of forming the convex/concave structure on the reflection plate surface with a desired configuration. Accordingly, the conventional reflective LCD apparatus requires a number of film formation steps, photoresist (PR) steps, and etching steps.

Currently, no effective means is employed to simplify the production procedure. The convex/concave structure below the reflection electrode is currently produced as follows. Firstly, a photosensitive resin is applied, which is then patterned by an exposure step and a development step so as to form a convex pattern. However, in the area other than the portion having this convex pattern, the photosensitive resin film is completely removed. After this, the convex pattern is subjected to a thermal treatment so as to obtain a smooth protrusion shape, which is then covered by an organic insulation layer so as to obtain a desired smooth convex/concave surface.

That is, the insulation film below the reflection electrode consists of two layers: a film of convex shape and a film covering it. This insulation film has a function as an inter-layer insulation film for electrically insulating the reflection electrode from the switching element and the wiring. After this, a contact hole is formed in this insulation layer. Then, a metal thin film such as aluminum is layered thereon. This metal thin film is patterned to obtain a reflection electrode along the fine convex/concave structure of the insulation film.

Thus, formation of the reflection electrode has required five steps: (1) formation of an insulation film for forming a protrusion as a base; (2) formation of a protrusion; (3) formation of a contact hole; (4) formation of a metal thin film having a high reflection efficiency; and (5) formation of a reflection electrode.

SUMMARY OF THE INVENTION

It is therefore an object of the present invention to provide a reflective LCD apparatus and a production method thereof for enabling a high-luminance and high-quality display capability by preventing deterioration of the switching element in the production procedure as well as reducing the production cost by reducing the number of production steps.

The reflective liquid crystal display (LCD) apparatus according to the present invention includes: a transparent first substrate; a transparent electrode arranged on the first substrate; a second substrate; a switching element arranged on the second substrate; an insulation film arranged on the switching element and having a convex/concave structure; a reflection electrode arranged on the insulation film along the convex/concave structure and connected to the switching element; and a liquid crystal layer sandwiched between transparent electrode of the first substrate and the reflection electrode of the second substrate. The insulation film protects the switching element after formed and the convex/concave structure is formed by irregular arrangement of regions having different thickness values.

In a conventional reflective LCD apparatus, protrusions are located on a metal wiring, electrode, switching element, and the like, which are exposed to a process atmosphere when forming the protrusions, causing deterioration of the switching element. According to the present invention, since the insulation film always covers the metal wiring, the electrode, the switching element, and the like, they are not exposed to a process atmosphere can be protected from a process damage. Moreover, in the present invention, the insulation film has regions having different film thickness values, i.e., protrusions having a large film thickness and indentations having a small film thickness. This eliminates need to form another film for the convex/concave structure.

According to another aspect of the present invention, the convex/concave structure has a continuous smooth shape. This enables to obtain a bright display because the luminance of the reflective LCD apparatus is determined by the inclination angle of the convex/concave structure of the reflection electrode.

According to yet another aspect of the present invention, the insulation film may be a single-layered film made from a single material. Thus, the insulation film is formed by a single layer by a single step. That is, there is no need to form the convex/concave structure and the inter-layer insulation portion by separate steps. This simplifies the convex/concave structure formation step which is complicated in the conventional reflective LCD apparatus.

According to still another aspect of the present invention, the insulation film may have a light absorption characteristic. Thus, the insulation film can absorb an incident light from between adjacent reflection electrodes. This enables to shut out the incident light which may be introduced to the back side of the reflection electrode, thereby suppressing radiation of the incident light to the switching element and enabling to realize a preferable switching characteristic.

According to still yet another aspect of the present invention, the convex/concave structure may have a plurality of protrusions arranged irregularly. This can suppress interference of the reflected light from the reflection electrode, thereby enabling to form a convex/concave structure having a preferable reflection capability. Furthermore, the protrusions may have an island shape or a line shape in a plan view. This enables to obtain a bright reflection capability. That is, in the reflective LCD apparatus using such a convex/concave structure, it is possible to obtain a bright display characteristic.

Moreover, the convex/concave structure may have a plurality of indentations arranged irregularly. This suppresses interference of the reflected light from the reflection electrode, thereby enabling to form a convex/concave structure having a preferable reflection characteristic. Furthermore, the indentations may have a hole shape or a line shape in a plan view. This enables to obtain a bright display characteristic. That is, in the reflective LCD apparatus using such a convex/concave structure, it is possible to obtain a bright display characteristic.

Moreover, the convex/concave structure may be formed by repetition of an irregular convex/concave shape based on one or more than one pixels. This can suppress interference of the reflected light. Accordingly, the reflective LCD apparatus produced by using this reflection electrode has no wavelength dependency by the light source or no deterioration of the color characteristic, thereby enabling to obtain a bright high-quality display characteristic.

Moreover, the insulation film having the convex/concave structure may be made from an organic resin or inorganic resin having photosensitivity. In this case, it is possible to form a desired convex/concave pattern by performing exposure and development directly to the photosensitive resin, eliminating the need of photoresist application, formation, development, and peel-off steps. Thus, the number of production steps is reduced, thereby enabling to reduce the cost of the reflective LCD apparatus.

The present invention also provides a reflective LCD apparatus production method for producing the reflective LCD apparatus. That is, the convex/concave structure is formed by performing photolithography to the insulation film to form a predetermined pattern while leaving a predetermined film thickness, so as to form regions having a large film thickness and regions having a small film thickness arranged irregularly in a plan view.

Thus, the convex/concave structure is formed in the insulation film using a mask pattern, which enables to accurately control a plan shape of the convex/concave pattern and to form a desired convex/concave pattern with a high reproducibility. Furthermore, when the insulation film is etched leaving a desired film thickness, it is possible to control the cross sectional shape of the convex/concave pattern with a high reproducibility. Accordingly, it is possible to realize a preferable convex/concave structure. Moreover, this can be performed by a single photoresist step and a single etching step. This can significantly simplify the production procedure. Moreover, since the metal wiring, the electrode, the switching element, the insulation film are not exposed to the process atmosphere (etching liquid, etching gas, and the like) and are not damaged, thereby enabling to realize a reflective LCD apparatus having a preferable element characteristic.

Furthermore, according another aspect of the present invention, the convex/concave structure may be formed by steps of: forming the insulation film, photolithography for forming a resist pattern on the insulation film, etching the insulation film leaving a predetermined film thickness at a lower portion of the insulation film, peeling off the resist film from the insulation film, and thermal treatment of the etched insulation film to melt the insulation film and make the convex/concave structure smooth.

According to this production method, it is possible to form a convex/concave pattern without exposing thee switching element, the wiring, the electrode, and the like located under the insulation film. Accordingly, it is possible to form the convex/concave pattern without damaging the switching element and the like. Moreover, the convex/concave insulation film under the reflection electrode, unlike the convex/concave insulation film in the conventional reflective LCD apparatus, does not need a step for forming basic protrusions and a step for forming a film thereon. The convex/concave insulation film can be formed by using a single film and by a single step. This simplifies the production procedure.

Furthermore, the convex/concave structure may be formed by steps of: forming the insulation layer using an organic insulation material or inorganic insulation material having photosensitivity, performing exposure for forming a convex/concave pattern on the insulation layer, development for performing etching-development so as to leave a predetermined film thickness at a lower portion of the insulation film, and performing thermal treatment of the etched and developed insulation film to melt the insulation film and make the convex/concave structure smooth.

This eliminates the resist application, formation, development, and peel-off steps required for forming the convex/concave structure. Exposure and development can be performed directly to the photosensitive resin to obtain a desired convex/concave pattern. Thus, the production procedure is further simplified, thereby reducing the cost for producing the reflective LCD apparatus.

Moreover, it is possible to use an organic insulation material or inorganic insulation material having photosensitivity for the insulation film, to which the convex/concave structure and the contact hole are simultaneously formed by a single development step. This enables to form the convex/concave structure and the contact hole without using the resist process.

Here, the photosensitivity may be positive type, and the step of exposure may be performed in such a manner that a smaller exposure light quantity is applied for formation of the convex/concave pattern and a greater exposure light quantity is applied for formation of the contact hole pattern. This eliminates the contact formation step, thereby simplifying the production procedure.

BRIEF DESCRIPTION OF THE DRAWINGS

FIG. 2 shows a reflective LCD apparatus production method according to Embodiment B1 of the present invention in cross sectional views FIG. 2[a] to FIG. 2[e] performed in this order.

FIG. 5 shows a reflective LCD apparatus production method according to Embodiment B3 of the present invention in cross sectional views FIG. 5[a] to FIG. 5[e] performed in this order.

FIG. 8[a] and FIG. 8[b] are plan views showing a first example and a second example of mask pattern of a reflective LCD apparatus according to Embodiment A4 of the present invention.

FIG. 14 shows a reflective LCD apparatus production method according to Embodiment B5 of the present invention in cross sectional views: steps shown in FIG. 14[a] to FIG. 14[g] are successively performed in this order.

FIG. 15 shows the reflective LCD apparatus production method according to Embodiment B5 of the present invention in cross sectional views: steps shown in FIG. 15[h] to FIG. 15[k] are successively performed in this order.

FIG. 18 shows a reflective LCD apparatus production method according to Embodiment B7 of the present invention in cross sectional views: steps shown in FIG. 18[a] to FIG. 18[g] are successively performed in this order.

FIG. 19 shows the reflective LCD apparatus production method according to Embodiment B7 of the present invention in cross sectional views: steps shown in FIG. 19[h] to FIG. 19[k] are successively performed in this order.

FIG. 20 shows a reflective LCD apparatus production method according to Embodiment B8 of the present invention in cross sectional views: steps shown in FIG. 20[a] to FIG. 20[h] are successively performed in this order.

FIG. 22 shows Example 1 of the reflective LCD apparatus production method according to the present invention in cross sectional views: steps shown in FIG. 22[a] to FIG. 22[f] are successively performed in this order.

FIG. 23 shows Example 1 of the reflective LCD apparatus production method according to the present invention in cross sectional views: steps shown in FIG. 23[g] to FIG. 23[j] are successively performed in this order.

FIG. 25 shows Example 2 of the reflective LCD apparatus production method according to the present invention in cross sectional views: steps shown in FIG. 25[a] to FIG. 25[g] are successively performed in this order.

FIG. 26 shows Example 2 of the reflective LCD apparatus production method according to the present invention in cross sectional views: steps shown in FIG. 26[h] to FIG. 26 are successively performed in this order.

FIG. 28 shows Example 3 of the reflective LCD apparatus production method according to the present invention in cross sectional views: steps shown in FIG. 28[a] to FIG. 28[g] are successively performed in this order.

FIG. 29 shows Example 2 of the reflective LCD apparatus production method according to the present invention in cross sectional views: steps shown in FIG. 29[h] to FIG. 29 are successively performed in this order.

FIG. 30 shows Example 4 of the reflective LCD apparatus production method according to the present invention in cross sectional views: steps shown in FIG. 30[a] to FIG. 30[g] are successively performed in this order.

FIG. 31 shows Example 4 of the reflective LCD apparatus production method according to the present invention in cross sectional views: steps shown in FIG. 31[h] to FIG. 31 are successively performed in this order.

FIG. 32 shows Example 5 of the reflective LCD apparatus production method according to the present invention in cross sectional views: steps shown in FIG. 32[a] to FIG. 32[g] are successively performed in this order.

FIG. 33 shows Example 5 of the reflective LCD apparatus production method according to the present invention in cross sectional views: steps shown in FIG. 33[h] to FIG. 33[l] are successively performed in this order.

DESCRIPTION OF THE PREFERRED EMBODIMENTS

Figure 1:
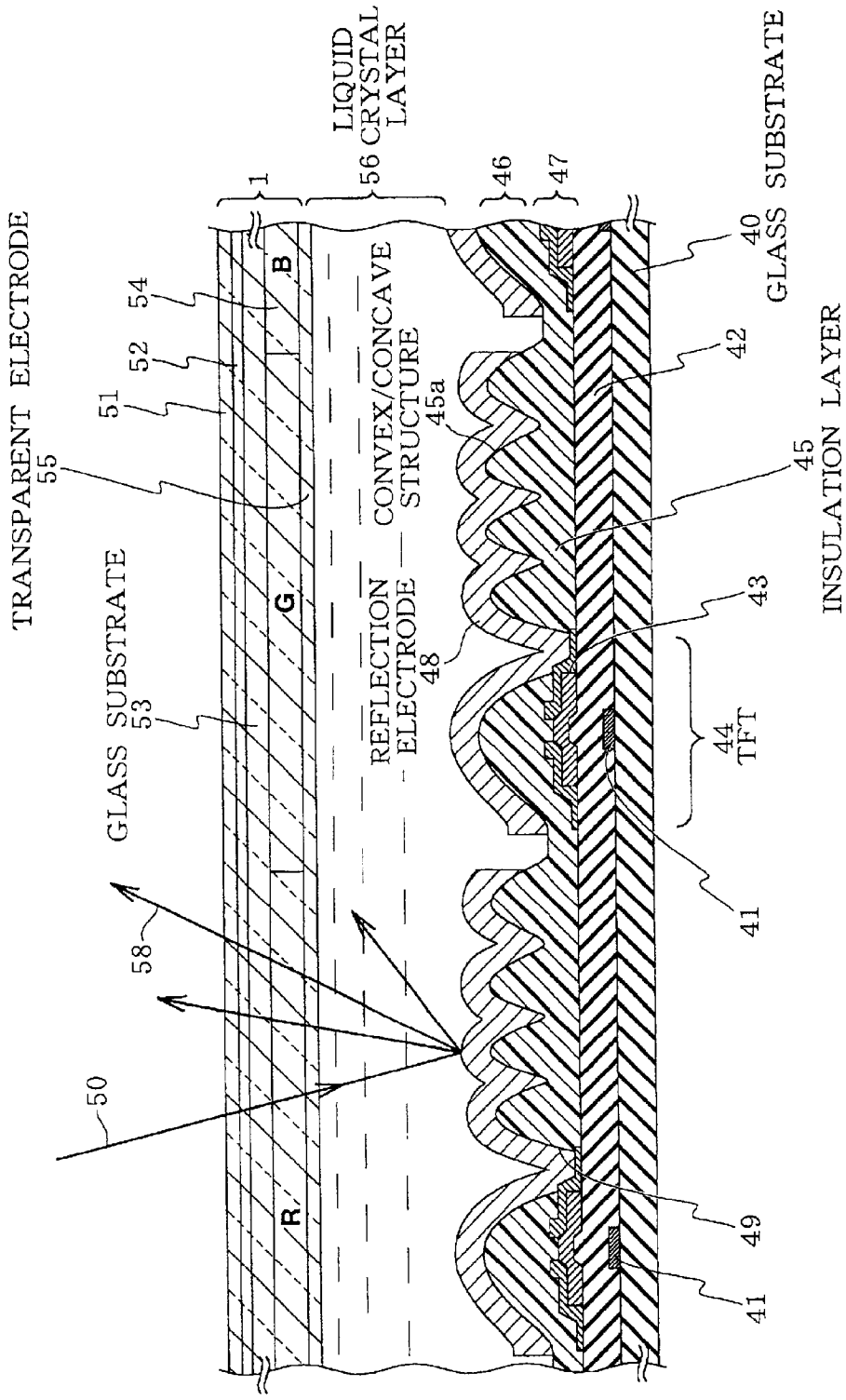
FIG. 1 is a cross sectional view of a reflective liquid crystal display (LCD) apparatus according to Embodiment A1 of the present invention.

FIG. 1 is a cross sectional view of a reflective liquid crystal display (LCD) apparatus according to Embodiment A1 of the present invention. Hereinafter, explanation will be given with reference to this figure.

The reflective LCD apparatus according to this embodiment includes a glass substrate 53 as a transparent first substrate, a transparent electrode 55 arranged on the glass substrate 53, a glass substrate 40 as a second substrate, a thin film transistor 44 as a switching element arranged on the glass substrate 40, an insulation film 45 arranged on the thin film transistor 44 and having a convex/concave structure 45a on its surface, a reflection electrode 48 having a shape reflecting the convex/concave structure 45a and connected to a source electrode of the thin film transistor 44, and a liquid crystal layer 56 sandwiched between the transparent electrode 55 of the glass substrate 53 and the reflection electrode 48 of the glass substrate 40. The insulation film 45 is formed with irregular film thickness to form the convex/concave structure 45a and protects the thin film transistor 44 after it is formed.

The thin film transistor 44 has an inverse stager configuration composed of a gate electrode, a gate insulation film, a semiconductor film, a source electrode, a drain electrode, and the like formed through formation of a metal layer 41, an insulation layer 42, a semiconductor layer 43, and the like, which are then subjected to photolithography and etching. Moreover, on the thin film transistor 44, an insulation layer 45 is arranged using an organic insulation material or an inorganic insulation material. The insulation film 45 has an irregular film thickness, forming a desired convex/concave structure 45a which is formed by protrusions 46 having a large film thickness and indentations 47 having a small film thickness. On the insulation film 45, a reflection electrode 48 is formed. The reflection electrode 48 is electrically connected via a contact hole 49 through the insulation film 45 to a source electrode of the thin film transistor 44 and has also a function as a pixel electrode.

Moreover, the reflection electrode 48 has a surface reflecting the convex/concave structure 45a formed in the insulation film 45 and this convex/concave inclination angle determines the optical characteristic of a reflected light. For this, the inclination angle of the convex/concave structure 45a is designed so as to obtain a desired reflection optical characteristic. It should be noted that the convex/concave structure 45a need be irregular (with two or more values) at least in one of the convex pitch, concave pitch, protrusion height, and indentation depth.

Next, explanation will be given on the operation of the reflective LCD apparatus according to the present embodiment.

The reflective LCD apparatus operates as follows when in the white state. Incident light 50 coming from out of the glass substrate 53 passes through the deflection plate 51, the phase difference plate 52, the glass substrate 53, the color filter 54, the transparent electrode 55, and the liquid crystal layer 56 and is reflected according to the directivity obtained by the convex/concave shape of the surface of the reflection electrode 48. The reflected light again passes through the liquid crystal layer 56, the transparent electrode 55, the color filter 54, the glass substrate 53, the phase difference plate 52, and the deflection plate 51 before returning outside as a display light 58. On the other hand, the reflective LCD apparatus in the black state operates as follows. The incident light 50 passes through the deflection plate 51, the phase difference plate 52, the glass substrate 53, the color filter 54, the transparent electrode 55, and the liquid crystal layer 56, and is reflected by the reflection electrode 48. However, the reflected light is stopped by the deflection plate 51 and cannot go outside. Thus, the light ON/OFF operation is performed.

FIG. 2 shows a reflective LCD apparatus production method according to Embodiment B1 of the present invention in cross sectional views. Hereinafter, explanation will be given with reference to this figure.

Firstly, a thin film transistor 44 is formed on a glass substrate 40 (FIG. 2[a]). Next, an acrylic resin film 60 is formed as an organic insulation film. A photoresist (not depicted) is applied thereon, which is exposed to light to form a convex/concave pattern. Etching is performed to form a convex/concave pattern 61 in the acrylic resin film 60. After this, the photoresist is peeled off (FIG. 2[b] and [c]). Next, photoresist (not depicted) is again applied, exposed, and developed. The acrylic resin film 60 is etched, the photoresist is peeled off, and a contact hole 62 is formed in the acrylic resin film 60 (FIG. 2[d]). Lastly, an aluminum film is formed, photoresist is applied, exposed, and developed. The aluminum film is etched and the photoresist is peeled off, thereby forming a reflection electrode 63 (FIG. 2[e]).

In the formation of the convex/concave structure in the acrylic resin film in steps shown in FIG. 2[b] and [c], a protrusion 46 having a large film thickness and an indentation 47 having a small film thickness are formed. By leaving the acrylic resin film 60 even in the region having a small film thickness, the switching element 44 can be entirely covered by the acrylic resin film 60. Here, the acrylic resin film 60 under the resist pattern is etched to a desired depth so as to leave a thin acrylic resin film 60. Thus, it is possible to form a convex/concave structure which also serves as an interlayer insulation film by the same material and the same process. It should be noted that by controlling the etching amount, it is possible to adjust the height 64 of the protrusion 46 and the film thickness of the indentation 47. Accordingly, it is possible to adjust the convex/concave structure or the film thickness of the indentation.

It should be noted that acrylic resin is used in this embodiment for the insulation film but the insulation film can be formed by using any material which simultaneously satisfies the convex/concave height required for the reflection plate optical characteristic and the film thickness required as the inter-layer film. For example, it is possible to use a polyimide resin or other organic resins. Moreover, it is also possible to use an inorganic insulation film such as a silicon nitride film and a silicon oxide film.

Here, considering the directivity of the reflected light, the convex/concave structure preferably has a height in a range from −0.2 to 4 micrometers and a pitch in a range from 1 to 30 micrometers. Furthermore, protrusions and indentations are to be arranged irregularly on a surface. That is, the protrusions may be arranged in an island-shaped pattern or a line-shaped pattern and the indentations may be arranged in a hold-shaped patter or a groove-shaped pattern. Basically, what is required is that these protrusions or indentations only need be arranged irregularly so as to suppress interference of the reflected light in the reflection electrode, thereby enabling to realize a bright preferable reflection characteristic not affected by the wavelength.

Figure 3A:
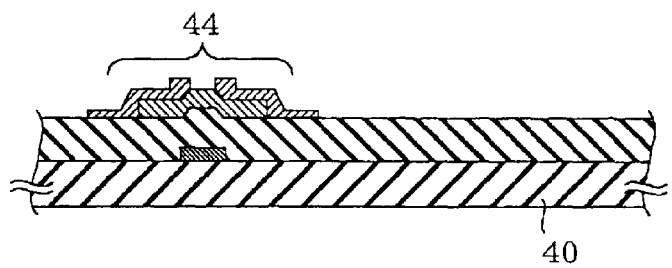
FIG. 3 shows a reflective LCD apparatus production method according to Embodiment B2 of the present invention in cross sectional views FIG. 3[a] to FIG. 3[c] performed in this order.
Figure 3B:
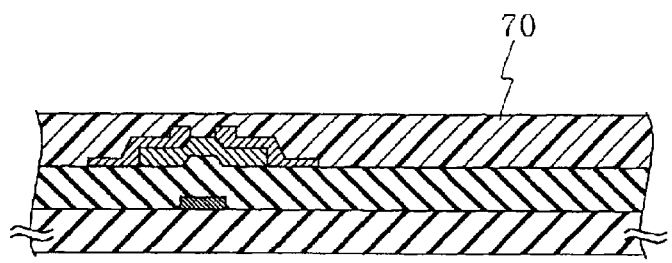
Figure 3C:
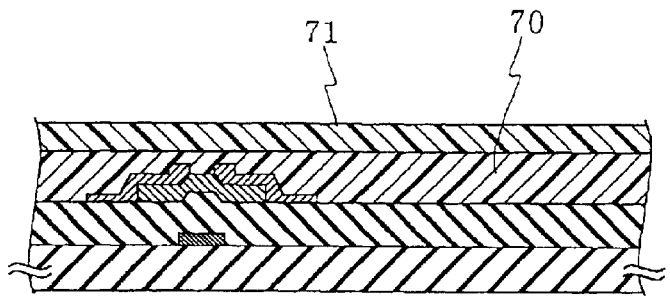
Figure 4D:
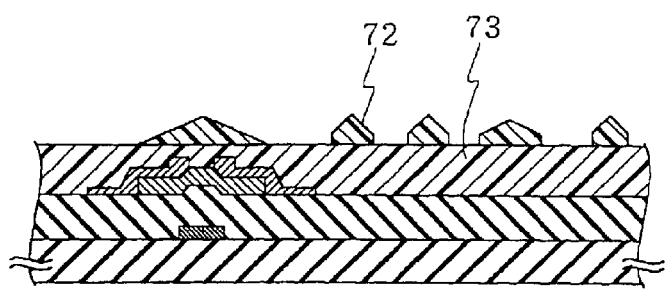
FIG. 4 shows the reflective LCD apparatus production method according to Embodiment B2 of the present invention in cross sectional views FIG. 4[d] to FIG. 4[f] performed in this order.
Figure 4E:
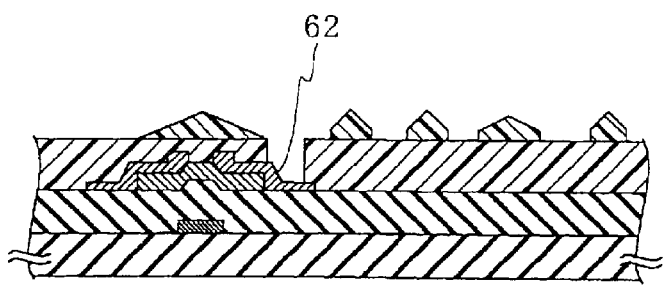
Figure 4F:
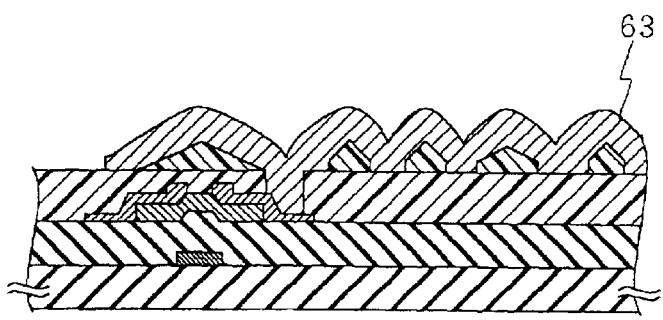

FIG. 3 and FIG. 4 are cross sectional views showing a reflective LCD apparatus according to Embodiment B2 of the present invention. Hereinafter, explanation will be given with reference to these figures.

In this embodiment, the insulation film below the reflection electrode consists of a convex/concave-shaped film and an inter-layer film which are formed in separate steps. Firstly, a lower-layer film 70 is formed (FIG. 3 and an upper-layer film 71 is formed (FIG. 3[c]). Next, photoresist patterning is performed to form a convex/concave pattern in the upper-layer film 71. Thus, the upper-layer film 71 serves as a convex/concave-shaped 72 and the lower-layer film 70 serves as an inter-layer film 73 (FIG. 4[d]). The other production steps are identical to those in the aforementioned embodiment of FIG. 2.

The lower-layer film 70 and the upper-layer film 71 may be formed from different materials. For example, the upper layer film 71 may be made from an organic resin such as acrylic resin with which the convex/concave shape can preferably be controlled while the lower-layer film 70 may be made from an inorganic insulation film such as a silicon nitride film having an excellent electric insulation, passivation characteristic, and process resistance. Moreover, the films to serve as the convex/concave-shaped film 72 and the inter-layer film 73 may also be formed from other materials in various combination if they satisfy the aforementioned requirements.

It should be noted that although explanation has been given on a case that a thin film transistor of the inverse stager structure is used as the switching element in this embodiment, it is also possible to use a thin film transistor or MIM diode of the forward stagger structure as the switching element. Moreover, the glass substrate used as the lower substrate and the opposing substrate may be replaced by a plastic substrate, a ceramic substrate, a semiconductor substrate, and the like. Furthermore, it is also possible to use a combination of these different substrates.

FIG. 5 shows a reflective LCD apparatus production method according to Embodiment B3 of the present invention. Hereinafter, explanation will be given with reference to this figure.

In this embodiment, protrusions formed are then subjected to a thermal treatment to change the convex/concave shape so as to obtain a smooth convex/concave structure under the reflective under the reflection electrode. The procedure to be performed up to the step FIG. 5[a] is identical to the procedure for forming the thin film transistor shown in FIG. 2. Next, an insulation film 74 is formed with protrusions and indentations (FIG. 5[b]) and then subjected to a thermal treatment for melting, thereby changing it into an insulation film 74' having a smooth convex/concave structure (FIG. 5[c]). Here, by changing the bake temperature and the bake time to change the melting state of the protrusions of the insulation film 74, it is possible to adjust the final convex/concave structure obtained. It should be noted that in this embodiment the thermal treatment is used to obtain a smooth convex/concave structure but it is also possible to expose the material used for the convex/concave structure to a solvent having a melting or swelling characteristic so as to obtain a smooth convex/concave structure.

After this, a contact hole 62 is formed (FIG. 5[d]) and a reflection electrode 63 is formed (FIG. 5[e]), thus completing production of the reflective TFR substrate. Thus the surface of the reflection electrode 63 can have a smooth convex/concave shape, thereby enabling to obtain a preferable reflection optical characteristic. The reflective LCD apparatus using this TFR substrate can realize a bright display. In this embodiment, in order to obtain a smooth convex/concave structure, a thermal treatment is used for melting. However, other methods can also be used to obtain the same effect. For example, it is possible to use a chemical for dissolving.

In the embodiments shown in FIG. 2 and FIG. 5, the insulation film located under the reflection electrode is formed by one step using a single material. That is, a single-layered film is formed as an insulation film under the reflection electrode and this single-layered film is patterned by the lift-off process. The insulation film is etched for selectively forming regions having a large film thickness and regions having a small film thickness, so as to be used for a convex/concave structure. Thus, the convex/concave structure can be formed by a single layer film, which simplifies the production procedure, enabling to provide a reflective LCD apparatus as a lower cost.

In the aforementioned embodiments, the photolithography is used to form the convex/concave structure by selectively forming regions having a large film thickness and regions having a small film thickness of the insulation film. However, it is also possible to use the screen printing method and adjust the film thickness of the print resin or to apply a chemical solution to the surface of the insulation film to make the surface rough to cause differences in the film thickness.

In the embodiments of FIG. 2 and FIG. 5, the insulation film under the reflection electrode is formed by a single step using a single material. However, as shown in the embodiment of FIG. 3 and FIG. 4, it is also possible to form an undercoat film and an upper film having protrusions by different production steps. Alternatively, it is possible to form the convex/concave structure using films formed from different materials. This can be used as the convex/concave structure of the insulation film to form the reflection electrode, enabling to obtain a reflection electrode having a desired optical characteristic. In this case, although there is a disadvantage that the number of production steps is increased, there is an advantage that it is possible to adjust the thickness of the undercoat film accurately.

Figure 6:
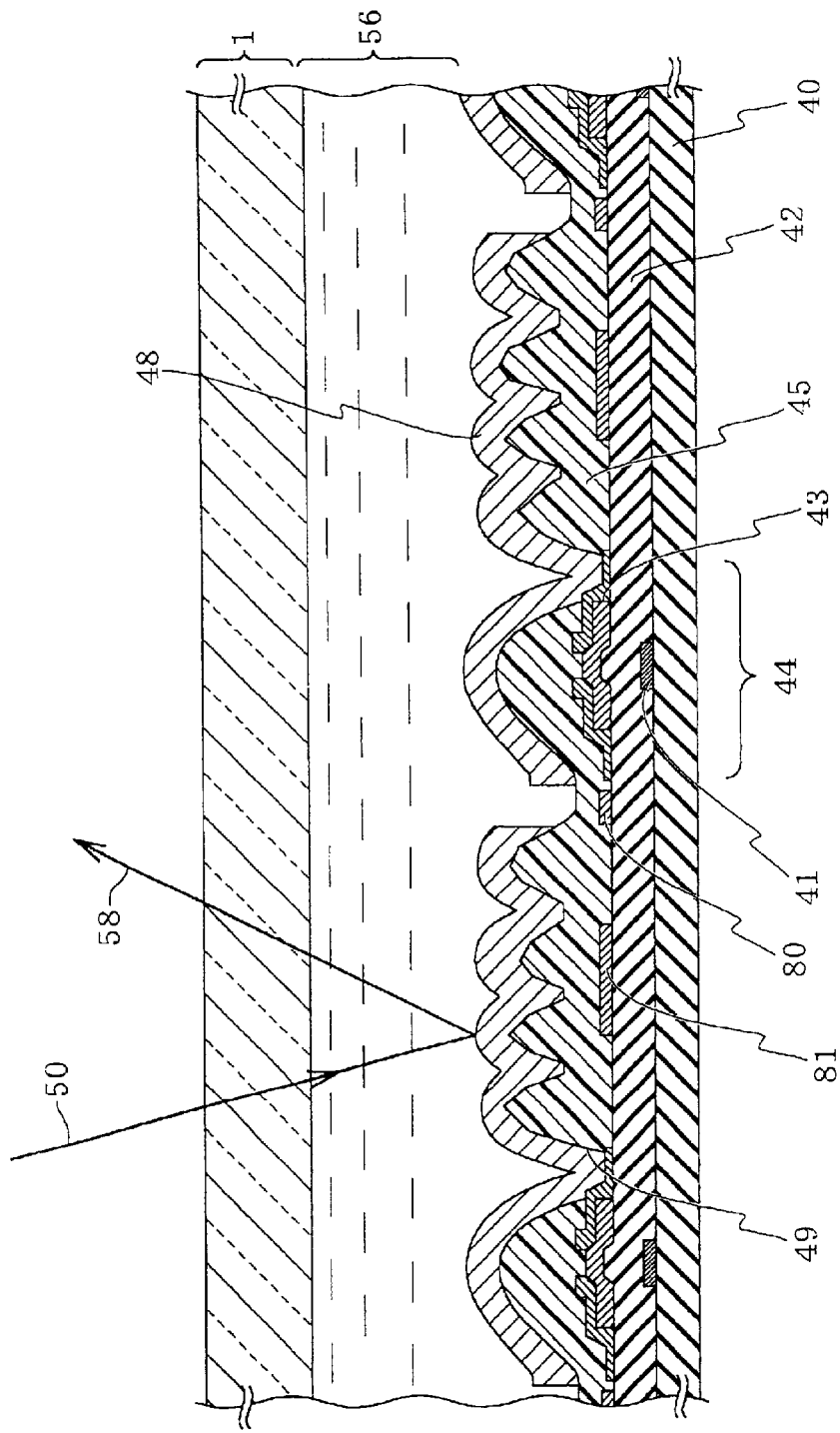
FIG. 6 shows a reflective LCD apparatus according to Embodiment A2 of the present invention in a cross sectional view.

FIG. 6 is a cross sectional view showing a reflective LCD apparatus according to Embodiment A2 of the present invention. Hereinafter, explanation will be given with reference to this figure.

In this embodiment, the insulation film 45 under the reflection electrode 45 is formed so as to cover the thin film transistor 44, the wiring 80, and the electrode 81. The reflection electrode 48 as the reflection plate and the pixel electrode electrically connected to the thin film transistor 44 by the contact portion 49 is electrically isolated from the lower layer via the insulation film 45. That is, the insulation film 45 has a function as a protection film. The insulation film 45 in this embodiment is in a direct contact with the thin film transistor 44 so as to be used as a passivation film of the thin film transistor 44. Between the insulation film 45 and the thin film transistor 44, it is possible to insert a silicon nitride film (SiN) or a silicon oxide film (SiO) conventionally used as a protection film of the thin film transistor 44.

Figure 7:
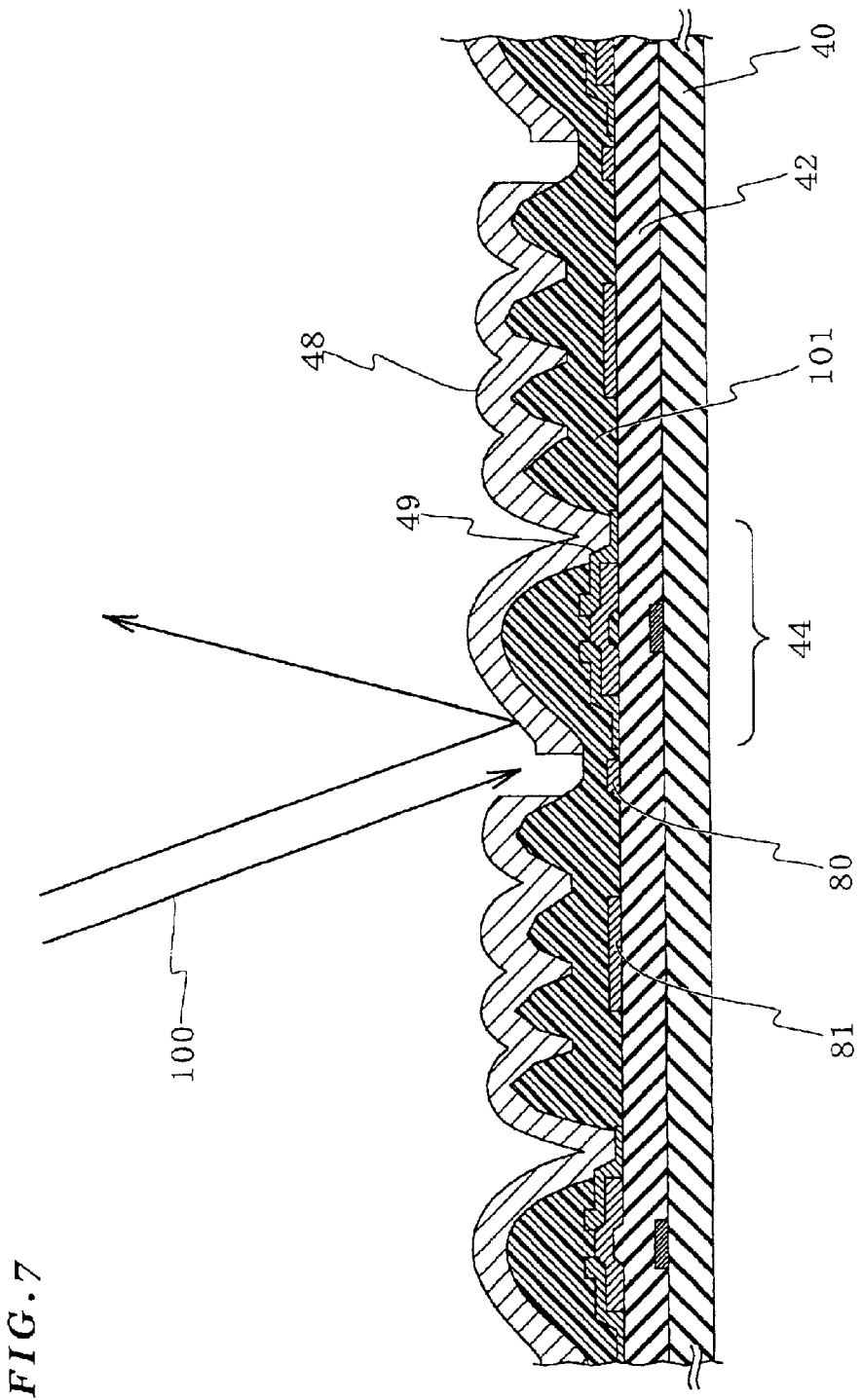
FIG. 7 shows a reflective LCD apparatus according to Embodiment A3 of the present invention in a cross sectional view.

FIG. 7 is a cross sectional view showing a reflective LCD apparatus according to Embodiment A3 of the present invention. Hereinafter, explanation will be given with reference to this figure.

In this embodiment, an insulation film 101 to be formed under the reflection electrode 48 may be formed using an organic resin or an inorganic resin if it has an insulation characteristic. Furthermore, the resin may have a transparency, coloring, and light-absorption characteristics. Especially when the insulation film 101 has a light-absorption characteristic, the light 100 incident between adjacent reflection electrodes 48 can be completely absorbed by the insulation film 101, thereby preventing light introduction into the thin film transistor 44. This can prevent light off-leak of the thin film transistor 44 characteristic, thereby enabling to realize a reflective LCD apparatus having a preferable switching element characteristic.

Here, the insulation film 100 having the light-absorption characteristic can be arranged at any position if it prevents the light from radiating the thin film transistor 44. Moreover, the insulation film 101 also serves as the insulation film having a smooth convex/concave structure under the reflection electrode 48. This simplifies the production process. When the insulation film 101 is made from "Black Resist" (trade name), "CFPR" (trade name), "BK-748S" (trade name), or "BK-430S" (trade name) which are produced by Tokyo Oyo-kagaku Kogyo Co., Ltd., it is possible to form a preferable light absorbing layer and a preferable convex/concave structure. Moreover, by using other Black resin materials, it is possible to obtain the similar effect. Furthermore, the light absorption layer may be replaced by a film having a light reflection characteristic such as a metal material or an insulation material or an inorganic compound film not transmitting light at all.

FIG. 8 is a plan view of a mask pattern used in a reflective LCD apparatus according to Embodiment A4 of the present invention.

As has been described in the aforementioned embodiments, the cross-sectional configuration of the convex/concave structure of the insulation film under the reflection electrode is selectively formed regions having a large film thickness and regions having a small film thickness in the insulation film. This convex/concave structure determines the convex/concave structure of the reflection electrode surface. This convex/concave structure of the insulation film is formed by using patterns irregularly arranged in a mask. FIG. 8 shows a mask pattern corresponding to one pixel used for formation of this convex/concave structure. It should be noted that reference numerals 110 and 112 denote light transmitting regions.

In this embodiment, protrusion patterns are irregularly arranged. Each of the protrusions has a size of about 2 to 20 micrometers and they are arranged at a pitch of about 2 to 40 micrometers. In FIG. 8[a], island-shaped protrusion patterns 111 are irregularly arranged, and in FIG. 8[b], line-shaped protrusion patterns 113 are irregularly arranged. Each of the masks enables to form a reflection electrode having a preferable reflection optical characteristic. Accordingly, the reflective LCD apparatus produced using these masks can have a preferable display characteristic.

It should be noted that in this embodiment the island-shaped patterns have an identical size and the line-shaped patterns have an identical thickness. However, the present invention is not to be limited to such patterns. For example, the island-shaped patterns may have different sizes and different shapes other than rectangular shape such as polygonal shapes (such as triangular, pentagonal, hexagonal, heptagonal shapes), circular shapes, and elliptic shapes. Furthermore, a combination of different shapes can also exhibit the similar effect. In the case of the line-shaped patterns, it is possible to use line patterns having various width values or curved lines. Moreover, it is also possible to use a combination of the island-shaped patterns and the line-shaped patterns.

Figure 9B:
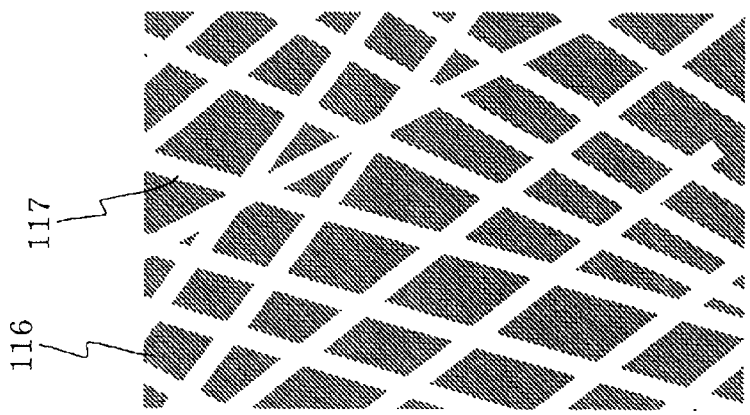
FIG. 9[a] and FIG. 9[b] are plan views showing a first example and a second example of mask pattern of a reflective LCD apparatus according to Embodiment A5 of the present invention.
Figure 9A:
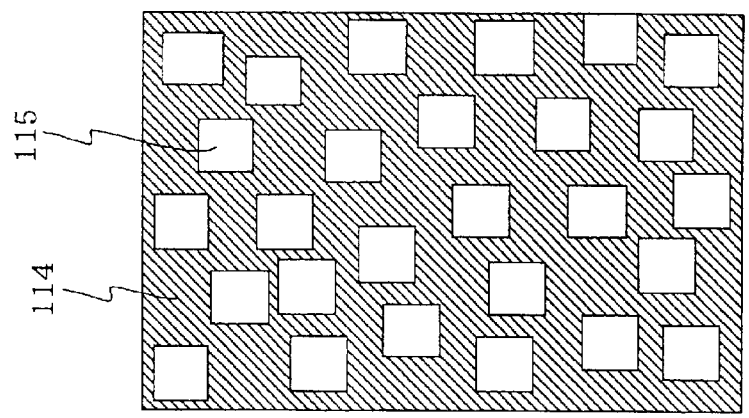

FIG. 9 is a plan view of a mask pattern used in a reflective LCD apparatus according to Embodiment A5 of the present invention. Hereinafter, explanation will be given with reference to this figure.

In this embodiment, the mask pattern has an inverse patterning of the mask pattern of FIG. 8. That is, hole-shaped indentation patterns 115 or groove-shaped indentation patterns 117 are irregularly arranged. By using such ask patterns, it has been possible to obtain a high-luminance reflection electrode. Here, the indentation patterns have a size of about 2 to 20 micrometers and are arranged at a pitch of about 2 to 40 micrometers. It should be noted that reference numerals 114 and 116 are regions not transmitting light.

In this embodiment also, the hole-shaped patterns having an identical size or groove-shaped patterns having an identical width are used. However, the present invention is not to be limited to these patterns. For example, the hole-shaped patterns may have different sizes and shapes other than the rectangular shape such as a polygonal shape (triangular, pentagonal, hexagonal, heptagonal shapes), circular shape, or elliptic shape. Furthermore, a combination of various shapes can also exhibit the similar effect. Furthermore, in the case of the groove-shaped pattern, it is possible to use line patterns having different width values or curved patterns. These patterns may be completely different from one another. Moreover, it is possible to use a combination of the hole-shaped patterns and the line-shaped patterns.

Figure 10A:
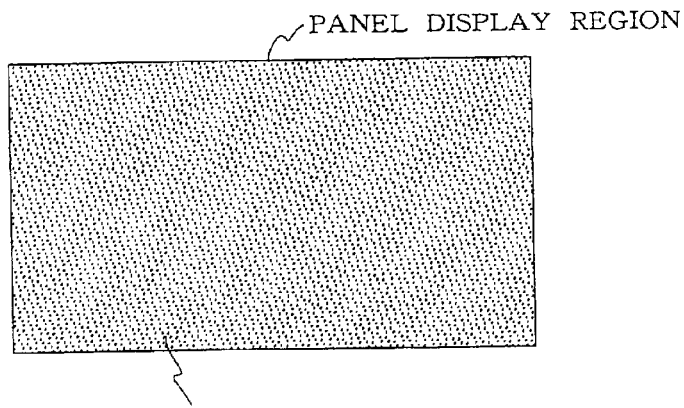
FIG. 10[a], FIG. 10[b], and FIG. 10[c] show a first, a second, and a third example of a reflective LCD apparatus according to Embodiment A6 of the present invention.
Figure 10B:
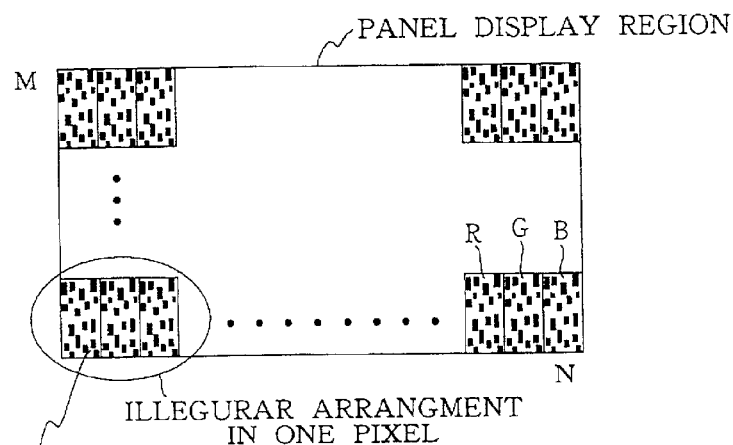
Figure 10C:
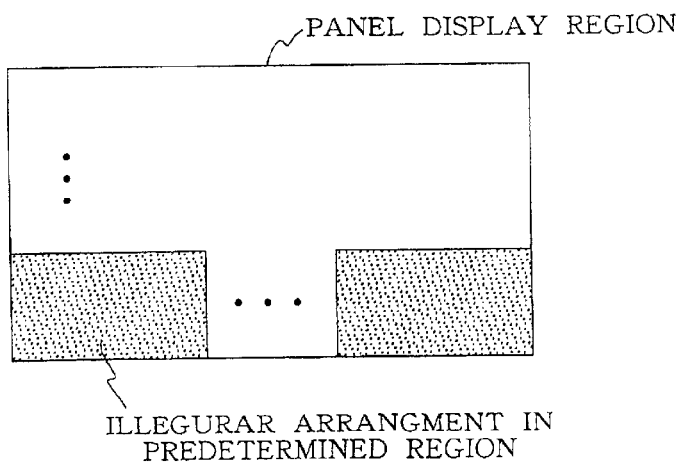

FIG. 10 explains a reflective LCD apparatus according to Embodiment A6 of the present invention. Hereinafter, explanation will be given with reference to this figure.

In this embodiment, the convex/concave pattern need be irregular at least within a pixel of the reflective LCD apparatus. For example, the pattern may be irregular within a three-pixel region or four-pixel region of the RGB or RGGB. Moreover, the pattern may be irregular over more than four pixels. Thus, the pattern is repeated to form the convex/concave structure in the reflection electrode region over the entire panel display surface. In this case, it is possible to obtain a reflection plate having the similar luminance as in the case when the entire surface of the reflection plate panel is formed by a completely irregular pattern.

FIG. 10[a] shows a display region formed with one irregular pattern over the entire display surface. FIG. 10[b] shows a display region formed by repetition of an irregular pattern within one pixel. FIG. 10[c] shows a display region formed by repetition of an irregular pattern within more than one pixel. It is preferable to repeat an irregular pattern within more than one pixel to form the convex/concave structure over the entire reflection electrode region. It should be noted that the present embodiment has been explained using a island-shaped pattern. However, the present invention is not to be limited to this. As shown in FIG. 8 and FIG. 9, the same effect can be realized by using the line-shaped pattern, the hole-shaped pattern, and the groove-shaped pattern.

Figure 11:
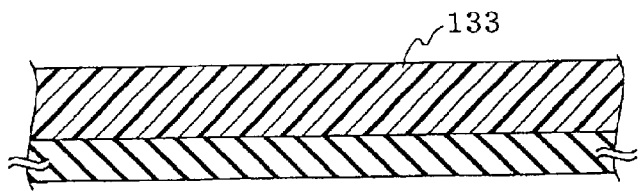
FIG. 11 shows a comparative example in cross sectional views against a reflective LCD apparatus production method according to Embodiment B4 of the present invention: steps shown in FIG. 11[a1] to FIG. 11[f1] are successively performed in this order.
Figure 11:
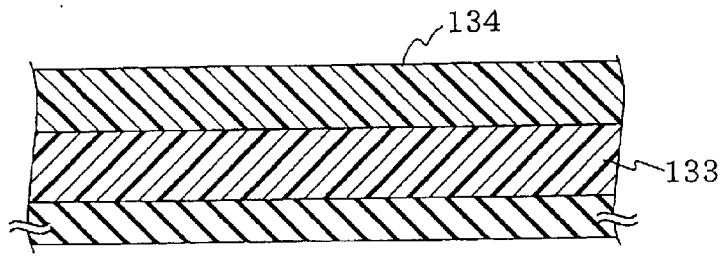
Figure 11:
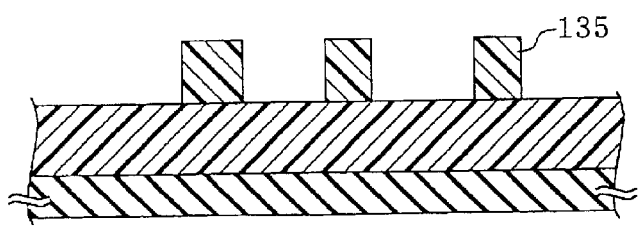
Figure 11:
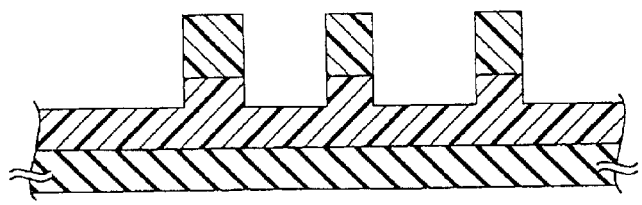
Figure 11:
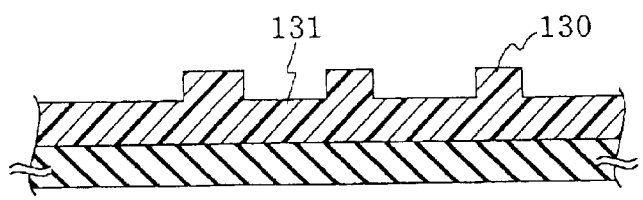
Figure 11:
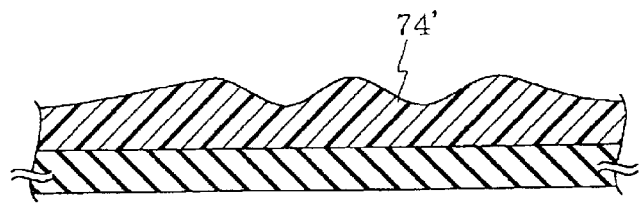
Figure 12:
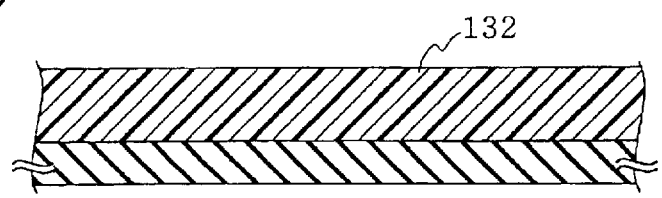
FIG. 12 shows the reflective LCD apparatus production method according to Embodiment B4 of the present invention in cross sectional views: steps shown in FIG. 12[a2] to FIG. 12[c2] are successively performed in this order.
Figure 12:
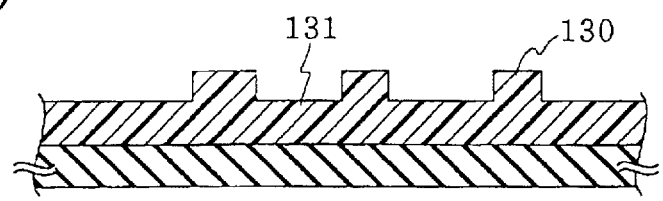
Figure 12:
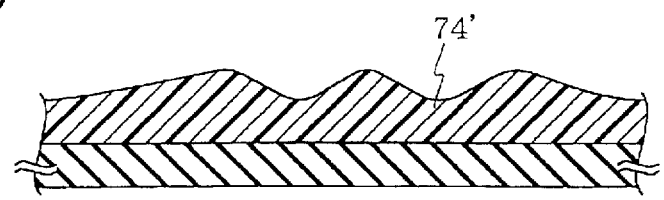

FIG. 12 is a cross sectional view showing a reflective LCD apparatus production method according to Embodiment B4 of the present invention and FIG. 11 shows a comparative example. Hereinafter, explanation will be given with reference to these figures.

This embodiment is identical to the embodiment of FIG. 2 except for that the insulation film under the reflection electrode is formed from a material having photosensitivity. FIG. 11 shows a comparative example in which the convex/concave pattern is formed in the insulation film 133 using photoresist. FIG. 12 shows the present embodiment B4. In this embodiment, the insulation film under the reflection electrode consists of an upper protrusion 130 and a lower layer film 131 which are both made from a photosensitive resin 132. In this case, the photosensitive resin 132 is applied and then exposed and developed to simultaneously form the upper protrusion 130 and the lower layer film 131.

This embodiment using a photosensitive resin eliminates need to perform the step of mask pattern 135 by the photoreist layer 134: FIG. 11[B1], [c1], and [d1]. That is, the patterning can be performed by directly exposing and developing the photosensitive resin and it is possible to simplify the resit application and peel-off step. Thus, the number of production steps on be reduced as compared to the Comparative Example of FIG. 11. As a result, it is possible to provide the reflective LCD apparatus as a lower cost.

It should be noted that the photosensitive resin used in this embodiment may be an organic resin such as acrylic resin and polyimide resin, or an inorganic resin. Moreover, as has been described above, the insulation film under the reflectdion electrode may consist of the upper protrusion portion and the lower layer film made from different photosensitive resins. Furthermore, it is possible to use a photosensitive resin only for the upper protrusion portion or the lower layer film. Moreover, the lower substrate or the opposing substrate used in this embodiment may be formed from a material other than the glass substrate. Moreover, the photosensitive resin used in this embodiment need not be transparent and may be black capable of absorbing light. For a semi-transparent LCD apparatus, a transparent photosensitive material can be used, and for a reflective LCD apparatus, a black photosensitive material can be used (as shown in Embodiment A7 below).

Figure 13A:
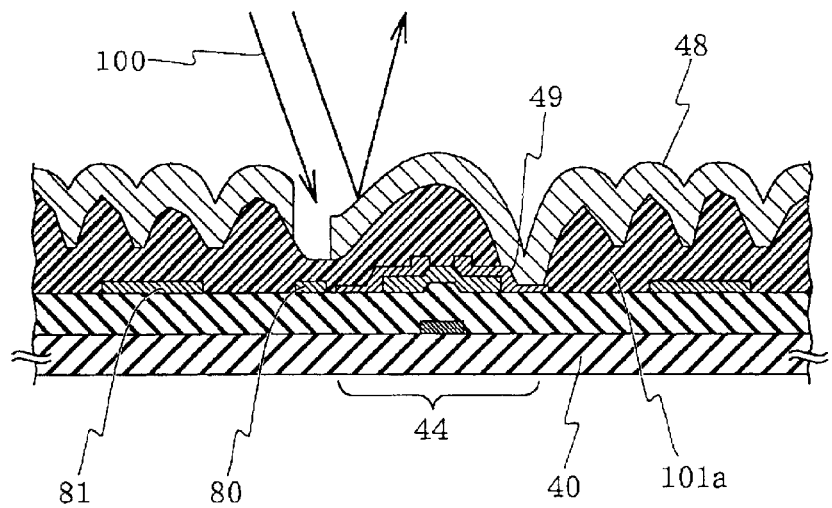
FIG. 13[a] shows a first example and FIG. 13[b] shows a second example of a reflective LCD apparatus according to Embodiment A7 of the present invention in cross sectional views.
Figure 13B:
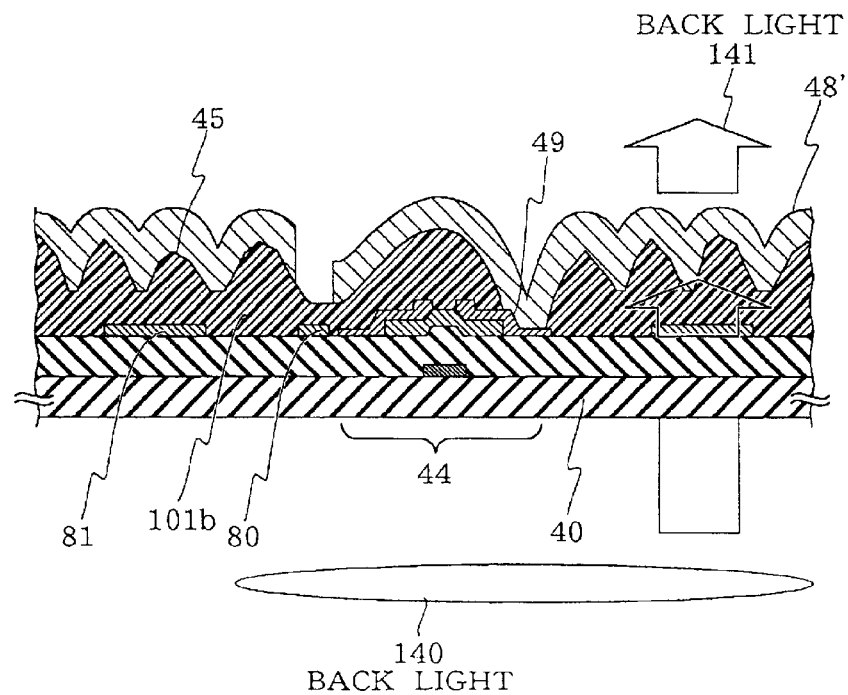

FIG. 13 is a cross sectional view showing a reflective LCD apparatus according to A7 of the present invention. Hereinafter, explanation will be given with reference to this figure.

FIG. 13[a] shows a reflective LCD apparatus using a black photosensitive material for an insulation film 101a. FIG. 13[b] shows a semi-transparent LCD apparatus, i.e., a reflective LCD apparatus also serving as a transparent type LCD apparatus, using a transparent photosensitive material for an insulation film 101b. In FIG. 13[b], by reducing the film thickness of the reflection electrode 48', the light of the back light 140 can pass through. It should be noted that the semi-transparent LCD apparatus is not to be limited to the aforementioned configuration. For example, it is possible to form at least one opening in the reflection electrode within each pixel of a certain region on the screen, so that the back light 141 can pass through that region.

FIG. 14 and FIG. 15 show a reflective LCD apparatus production method according to Embodiment B5 of the present invention in cross sectional views. Hereinafter, explanation will be given with reference to these figures.

In this embodiment, a thin film transistor of inverse stagger structure is used as a switching element. The TFT substrate production procedure in this embodiment includes: [a] formation of an electrode material, [b] formation of a gate electrode 150, [c] formation of a gate insulation film 151, a semiconductor layer 152, and a doping layer 153, [d] formation of an electrode material, [e] formation of an island, [f] formation of a source electrode 155 and a drain electrode 156, [g] formation of an insulation film 157, [h] formation of a convex/concave structure 158 in the upper layer of the insulation film, [i] formation of a contact hole, and [j] formation of a reflection electrode 160.

Furthermore, step [h] includes (1) formation of resist 163 on the insulation film 157, (2) formation of the convex/concave pattern 164, (3) formation of a convex/concave structure 158 on the upper layer of the insulation film 157, and (4) peeling off of the resist. Here, the height of protrusions X in the convex/concave structure and the film thickness Y of the lower layer can be adjusted by controlling the etching amount of the upper layer of the insulation film 157. Accordingly, the height X can be determined according to desired reflection plate optical characteristic while the lower layer film thickness Y can be determined according to the coverage and insulation characteristic for the switching element and wiring in the undercoat layer.

It should be noted that while the present embodiment has been explained for the case when using the thin film transistor of the inverse stagger configuration as the switching element, it is also possible to use a thin film transistor of forward stagger configuration or MIM diode as the switching element. Moreover, the thin film transistor of the inverse stagger configuration is not to be limited to the one explained in this embodiment but may have a configuration other than this. Moreover, the glass substrate used for the lower substrate and the opposing substrate may be replaced by a plastic substrate, a ceramic substrate a semiconductor substrate, or the like. Furthermore, in the present embodiment, the step (3) for forming a convex/concave structure on the surface of the insulation film may be performed as formation of a plurality of films by a plurality of steps.

Figure 16:
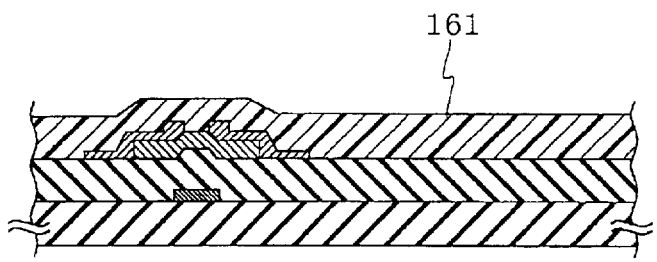
FIG. 16 shows a reflective LCD apparatus production method according to Embodiment B6 of the present invention in cross sectional views: steps shown in FIG. 16 to FIG. 16 are successively performed in this order.
Figure 16:
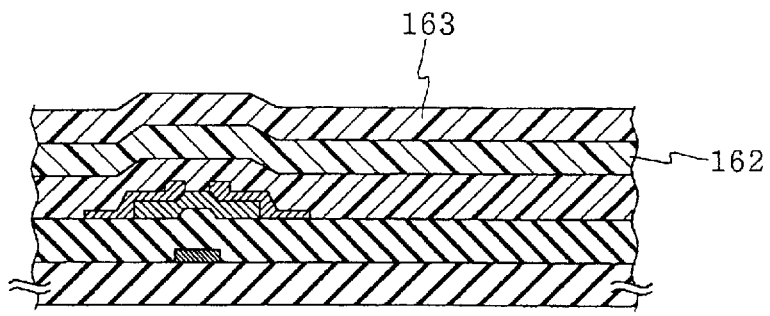
Figure 16:
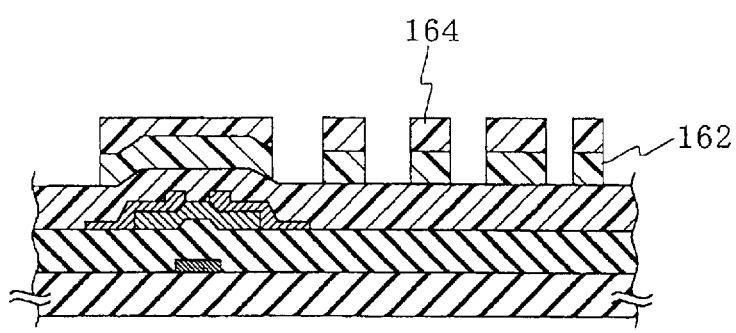
Figure 17:
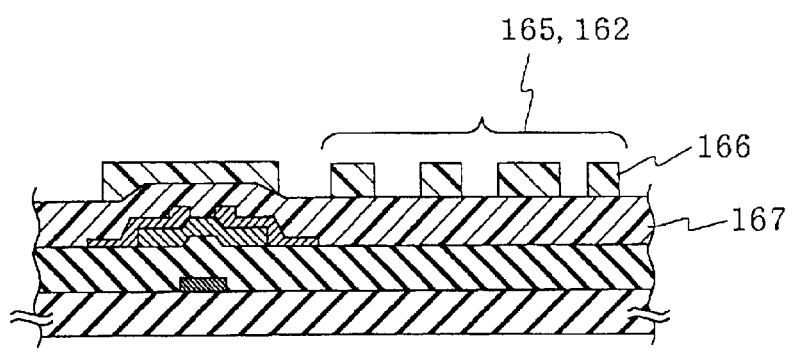
FIG. 17 shows the reflective LCD apparatus production method according to Embodiment B6 of the present invention in cross sectional views: steps shown in FIG. 17 to FIG. 17 are successively performed in this order.
Figure 17:
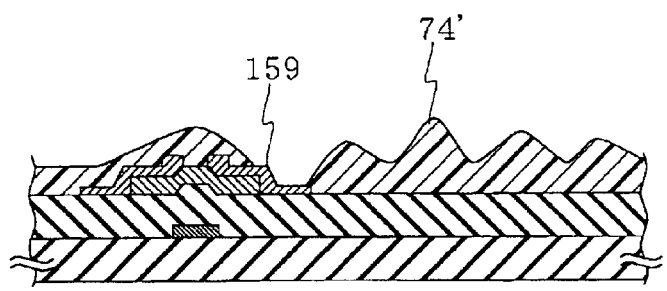
Figure 17:
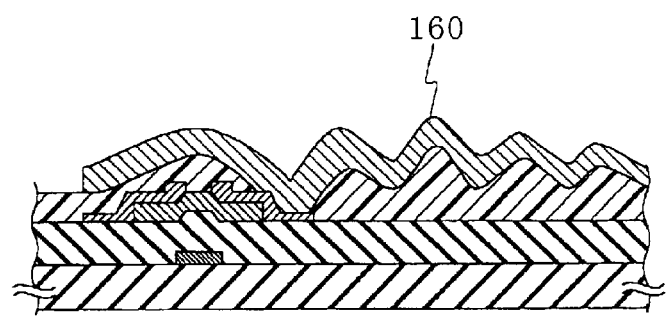

FIG. 16 and FIG. 17 shows a reflective LCD apparatus production method according Embodiment B6 of the present invention in cross sectional views. Hereinafter, explanation will be given with reference to these figures.

The present embodiment is identical to the production procedure of FIG. 14 and FIG. 15 except for the formation of an insulation film having a convex/concave structure on the surface. That is, after the steps FIG. 14[a] to [f] including the formation of the switching element, the insulation film having the convex/concave structure according to the present embodiment is formed by (1) formation of an insulation layer 161 for inter-layer film, (2) formation of an insulation layer 162 for forming protrusions and indentations, (3) formation of the convex/concave pattern 164 using the resist 163, (4) formation of the convex/concave structure 165, and (5) peeling off of the resist.

Thus, the convex/concave layer 166 and the lower layer film 167 of the insulation layer formed under the reflection electrode can be formed by separate steps. For this, the convex/concave layer of the upper layer can be formed by using acrylic resin capable of easily controlling the convex/concave structure for the convex/concave layer of the upper layer while the lower layer can be formed by using silicon nitride having excellent passivation or electric insulation characteristic with respect to the undercoat. Thus, it is possible to provide a switching element substrate having a preferable optical characteristic as well as preferable element characteristic. This enables to realize a reflective LCD apparatus exhibiting a high performance and high quality display.

It should be noted that the convex/concave layer and the lower layer film used in this embodiment are not to be limited to the aforementioned. It is possible to use an organic insulation film such as polyimide and an inorganic insulation film such as silicon oxide film or to use a single material for both of the upper layer and the lower layer.

FIG. 18 and FIG. 19 are cross sectional views showing a reflective LCD apparatus production method according to Embodiment B7 of the present invention. Hereinafter, explanation will be given with reference to these figures.

This embodiment is identical to the embodiment of FIG. 14 and FIG. 15 except for that the insulation film 157 under the reflection electrode 160 is formed from a material having photosensitivity.

According to this embodiment, patterning can be performed by directly exposing and developing the photosensitive resin, which simplifies the resist application and peel-off steps, significantly reducing the number of the production steps shown in FIG. 14 and FIG. 15. This enables to provide a reflective LCD apparatus at a low cost.

Figure 21I:
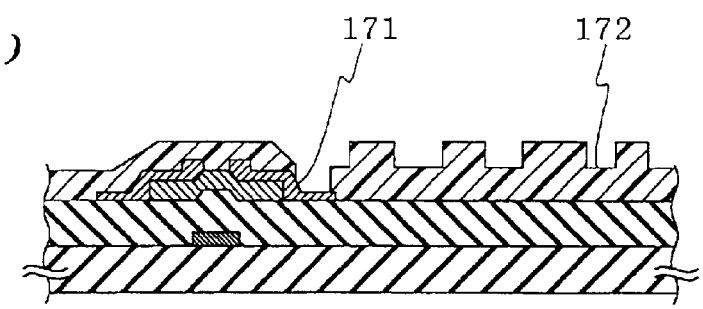
FIG. 21 shows the reflective LCD apparatus production method according to Embodiment B8 of the present invention in cross sectional views: steps shown in FIG. 21[i] to FIG. 21[j] are successively performed in this order.
Figure 21J:
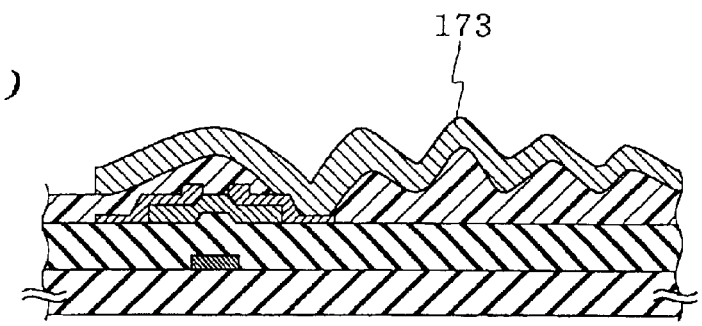

FIG. 20 and FIG. 21 are cross sectional views showing a reflective LCD apparatus production method according to Embodiment B8 of the present invention. Hereinafter, explanation will be given with reference to these figures.

This embodiment is identical to the embodiment shown in FIG. 18 and FIG. 19 except for that the contact hole formation in the insulation film under the reflection electrode is performed simultaneously with the protrusion/indentation formation. In this embodiment, the TFT substrate is produced by the following steps: [a] formation of the electrode material, [b] formation of the gate electrode, [c] formation of the gate insulation film, the semiconductor layer, and the doping layer, [d] formation of the electrode material, [e] formation of the island, and [f] formation of the source electrode and the drain electrode, which are followed by [g] formation of the photosensitive insulation layer 170, [h] exposure to the photosensitive insulation layer (the contact region 171 and the convex/concave region 172), [i] simultaneous formation of the contact to the photosensitive insulation layer and protrusions/indentations and melting of the protrusion and indentation surfaces by thermal treatment, and [j] formation of the reflection electrode 173.

In step [h] of this embodiment, a pattern of the contact formation region and a pattern of the protrusion/indentation formation region are simultaneously exposed in a single exposure step. After this, in the development/etching step, the etching is performed so that the indentations have a depth of X and the contact formation portions have a depth of Z.

In this step [h], the exposure energy amount need adjusted so that more energy is applied to the contact portion 174 than to the convex/concave pattern portion 175 and the lower layer portion of the photosensitive insulation layer 170 has a desired film thickness Y. The exposure amount adjustment may be made, for example, by using a convex/concave pattern formation mask and a contact pattern formation mask and performing dual exposure so that the exposure amount differs in respective patterns. Alternatively, it is possible to use a single mask in which a mask material is adjusted to obtain different light transmission values for the concave/convex pattern portion and the contact pattern portion. Thus, by providing different exposure energies for the respective patterns in the exposure step, it is possible to realize pattern formations having different etching amounts within a single substrate under a single development condition. In this embodiment, the convex/concave surface is converted into a smooth convex/concave curve by performing a thermal treatment to the insulation film.

According to this embodiment, patterning can be performed by directly exposing and developing the photosensitive resin and it is possible to simultaneously perform the protrusions/indentations formation step and the contact formation step with a single exposure and development/ etching. This further reduces the number of production steps as compared to the embodiment shown in FIG. 18 and FIG. 19, enabling to provide a reflective LCD apparatus at a low cost.

Moreover, in this embodiment, a photosensitive material is used for formation of the convex/concave insulation layer. When a resist process is performed, the same configuration can be obtained using a non-photosensitive material. Although this increases the number of steps, the number is still smaller as compared to the conventional reflective LCD apparatus production method.

EXAMPLES

Example 1

FIG. 22 and FIG. 23 show production steps for producing a reflective LCD apparatus in this example. As a switching element, a thin film transistor of forward stagger structure was used.

The production was performed by following production steps on a glass substrate. [a] formation of an ITO film with 50 nm thickness by sputtering

[b] formation of a source 200 and a drain electrode 201 (using 1st photoresist)

[c] use of plasma CVD to form a doping layer 202 with 100 nm thickness, a semiconductor layer 203 with 100 nm thickness, and a gate insulation film 204 with 400 nm thickness

[d] formation of a Cr layer 205 with 50 nm thickness by sputtering

[e] formation of a gate electrode and an island 206 of the TFT element portion (using 2nd photoresisit)

[f] formation of an organic insulation film 207 (3 micrometers)

[g] formation of a convex/concave pattern 208 on the upper layer of the organic insulation film (using 3rd photoresist)

[h] formation of a contact 209 (using 4th photoresist)

[i] formation of an aluminum film with 300 nm thickness by sputtering

[j] formation of a reflection pixel electrode plate 210 (using 5th photoresist)

It should be noted that in the aforementioned step [c], a combination of a silicon oxide film and a silicon nitride film was used for the gate insulation film, an amorphous silicon film was used for the semiconductor layer, and an n-type amorphous silicon film was used for the doping layer. The plasma CVD condition for them was set as follows. For the silicon oxide film, silane and oxygen were used as reaction gases which were supplied at a ratio (silane/oxygen) of 0.1 to 0.5; and the film formation was performed at a temperature of 200 to 300 degrees C. under a pressure of 133 Pa with a plasma power of 200W. For the silicon oxide film, silane and ammonium were used as reaction gasses which were supplied a ratio (silane/ammonium) of 0.1 to 0.8; and the film formation was performed at a temperature of 250 degrees C. under pressure of 133 Pa with a plasma power of 200 W. For the amorphous silicon, silane and hydrogen were used as reaction gases which were supplied at a ratio (silane/hydrogen) of 0.25 to 2; and the film formation was performed at a temperature of 200 to 250 degrees C. under a pressure of 133 Pa with a plasma power of 50 W. For the n-type amorphous silicon film, silane and phosphoine were used as reaction gasses which were supplied at a ratio (silane/phosphine) of 1 to 2, and the film formation was performed at a temperature of 200 to 250 degrees C. under a pressure of 133 Pa with a plasma power of 50 W.

Moreover, in the aforementioned step [e] for forming an island of the TFT element portion, wet etching was used for the Cr layer and dry etching was used for the silicon oxide film, the silicon nitride film, and the amorphous silicon layer. The etching of the Cr layer was performed by using an aqueous solution mixture of perhydrochloric acid and serium II nitrate ammonium. Moreover, the etching of the nitrate film and the silicon oxide film was performed by using as the etching gas fluorine tetracholoride and oxygen under a reaction pressure of 0.665 to 39.9 Pa with a plasma power of 100 to 300 W. Moreover, the etching of the amorphous silicon layer was performed by using chlorine and hydrogen gases under a reaction pressure of 0.665 to 39.9 Pa with a plasma power of 50 to 200 W. Moreover, the photolithography step was performed by using the conventional resist process.

In this example, ITO was used for the source and the drain electrode, but it is also possible to use a material other than this such as Ti, W, Mo, Ta, Cu, Al, Ag, ZnO, SnO to form a single-layered film or a multi-layered film using a combination of these materials. The gate electrode can also be formed by using other than Cr such as Ti, W, Mo, Ta, Cu, Al, Ag, and the like to form a single-layered film or multi-layered film using a combination of these materials.

In this example, the protrusions/indentations under the reflection electrode are formed in the aforementioned steps [f] and [g]. That is, on the insulation film formed in step [f], a resist film of 2 micrometers is formed and exposed and developed to form a convex/concave resist pattern. The insulation film was etched to obtain a depth of 1 micrometer and the resist was peeled off to form a convex/concave structure in the upper layer of the insulation layer.

In the aforementioned step [f] for forming the organic insulation film, polyimide ("RN-812" (trade name) produced by Nissan Kagaku Kogyo Co., Ltd.) was used. The polyimide was applied at spin rotation speed of 1200 rpm. The pre-bake was performed at temperature of 90 degrees C. for 10 minutes, and the post-bake was performed at temperature of 250 degrees for 1 hour. On the other hand, in the case of the resist used for the pattern formation, the spin rotation speed was set to 1000 rpm, the preparatory baking was set to 90 degrees C. for 5 minutes. After this, pattern formation was performed by exposure and development and a post-bake was performed at 90 degrees C. for 30 minutes. The dry etching of the polyimide film using the resist pattern as a mask layer was performed by using as a etching gas a mixture of fluorine tetrachloride and oxygen which were supplied at a rate (fluorine tetrachloride/oxygen) of 0.5 to 1.5 under a reaction pressure of 0.665 to 39.9 Pa with a plasma power of 100 to 300 W. It should be noted that the photolithography was performed using a conventional resist process.

Moreover, in this example, the insulation layer formed by a single step is also used for the convex/concave insulation layer located between the reflection plate and the TFT element. As another example, after completion of the TFT formation in step [e], a first insulation film (2 micrometers) using an organic resin, a second insulation film was formed (1 micrometer) using an organic resin, and a resist process and an etching process were performed to form a convex/concave structure in the second organic resin. Thus, it was also possible to form a desired convex/concave insulation layer. The basic production process is identical to the one in the aforementioned example.

Moreover, while the first insulation film and the second insulation film were formed by using a single organic resin material, it was also possible to form the convex/concave insulation layer by using different materials, including a combination of an inorganic resin and an organic resin such as acrylic resin and polyimide resin; silicon nitride film and acrylic resin; and silicon oxide film and polyimide resin.

In Example 1, an aluminum metal having a high reflection efficiency and capability for the TFT process was formed and patterned to form the pixel electrode also serving as the reflection plate. Here, the aluminum was subjected to wet etching using an etching liquid consisting of phosphoric acid, acetic acid, and nitric acid heated to 60 degrees C.

In this example, during the protrusions/indentations formation step, the patterning for forming the protrusions/indentations is performed while the switching element is covered by the insulation layer. Accordingly, the switching element is not exposed directly to the etching process. Thus, there is no danger of damaging the switching element characteristic or causing a problem such as instability and it is possible to obtain a reflective LCD having a high performance.

It should be noted that the maximum height of protrusions was set to about 1 micrometer and the convex/concave structure was set to a random shape. After this, the aforementioned TFT substrate was attached to the opposing substrate having the transparent electrode made from ITO in such a manner that their film surfaces oppose to each other. It should be noted that the TFT substrate and the opposing substrate were subjected to an orientation treatment and they are attached to each other via spacers such as plastic particles by applying an epoxy-based adhesive to the peripheral portion of the panel. After that, a liquid crystal was introduced to form a liquid crystal layer, thus completing the reflective LCD apparatus.

Figure 24:
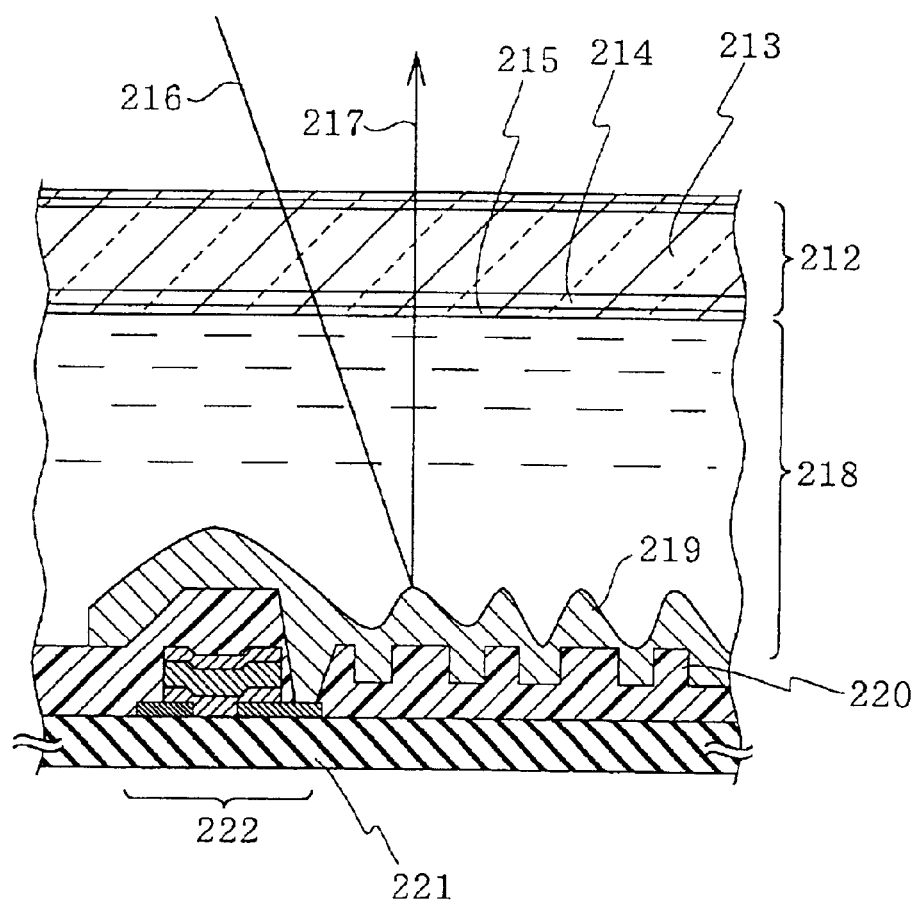
FIG. 24 is a cross sectional view of a reflective LCD apparatus prepared by Example 1 of the present invention.

FIG. 24 is a cross sectional view of the reflective LCD apparatus obtained in Example 1. In FIG. 24, the LCD apparatus includes an opposing substrate 212, an upper glass substrate 213, a color filter 214, an ITO (indium tin oxide), a liquid crystal 218, a reflection plate 219, an organic insulation film 220, and a glass substrate 221. Reference numeral 216 denotes an incident light and 217, a reflected light.

This reflective LCD apparatus includes a reflection pixel electrode having uniform reflection capability preferably scattering light. Accordingly, it is possible to realize a monochromatic reflective panel having a white display of luminance higher than a newspaper at a low cost. Moreover, when an RPG color filter is arranged on the opposing substrate, it is possible to realize a bright color reflective panel at a low cost. It should be noted that the height of protrusions of the convex/concave structure is not to be limited to the aforementioned value. The height of protrusions may be varied in a wide range and by using this convex/concave structure, it is possible to provide a reflective LCD apparatus in which directivity of the reflection plate performance is significantly changed.

Example 2

FIG. 25 and FIG. 26 show production steps for producing a reflective LCD apparatus used in Example 2. For the switching element in this reflective LCD apparatus, a thin film transistor of inverse stagger configuration was used.

The production was performed on the glass substrate 230 through following steps.

[a] formation of Cr film of 50 nm thickness by sputtering

[b] formation of a gate electrode 231 (1st photoresist)

[c] formation of a gate insulation film 232 of 400 nm thickness, a semiconductor layer 233 of 100 nm thickness, and a doping layer 234 of 100 nm thickness by using the CVD method

[d] formation of an island 235 (2nd photoresist)

[e] formation of a Cr layer and an ITO layer by sputtering

[f] formation of a source electrode 236 and a drain electrode 237 (3rd photoresist)

[g] formation of an organic insulation film 238 (3 micrometers)

[h] formation of a convex/concave pattern 239 in the upper layer portion of the organic insulation film (4th photoresist)

[i] formation of a contacdt 241 (5th photoresist)

[j] formation of an aluminum 242 with 300 nm thickness by sputtering

[k] formation of a reflection pixel electrode plate 243 (6th photoresist)

[l] taking out of a gate line (7th photoresist)

In this example, the protrusions/indentations 240 under the reflection plate are formed in the aforementioned step [g]. The formation conditions were set identically as in Example 1. In this example, since the transistor configuration uses the inverse stagger configuration, the number of steps is increased as compared to Example 1.

It should be noted that the ratio of hole area in the reflection pixel electrode plate in this example was set to 86%. The TFT substrate was attached to the opposing substrate having the transparent electrode made from ITO in such a manner that their film surfaces oppose to each other. The TFT substrate and the opposing substrate were subjected to an orientation treatment and attached to each other via a spacer such as plastic particles by applying an epoxy-based adhesive to a panel peripheral portion. After this, GH-type liquid crystal was introduced to form a liquid crystal layer, thus completing the reflective LCD apparatus.

Figure 27:
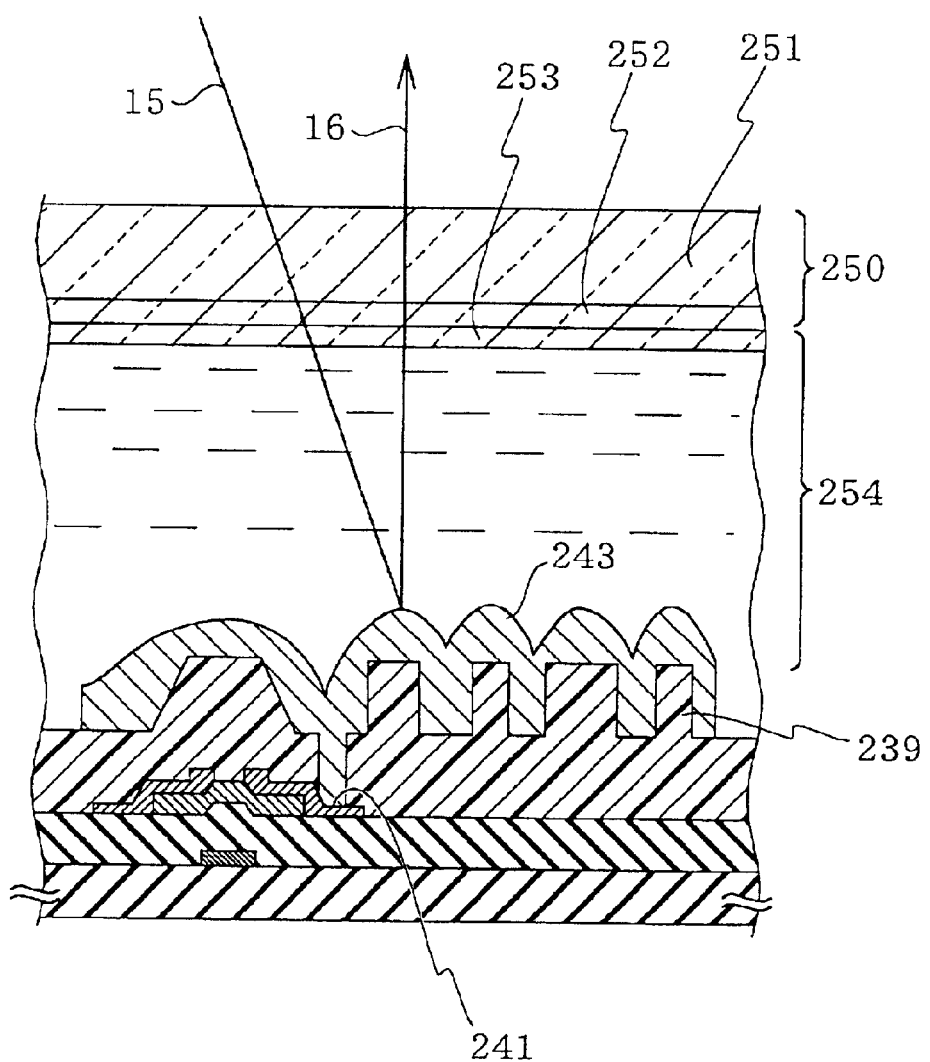
FIG. 27 is a cross sectional view of a reflective LCD apparatus prepared by Example 2 of the present invention.
Figure 34:
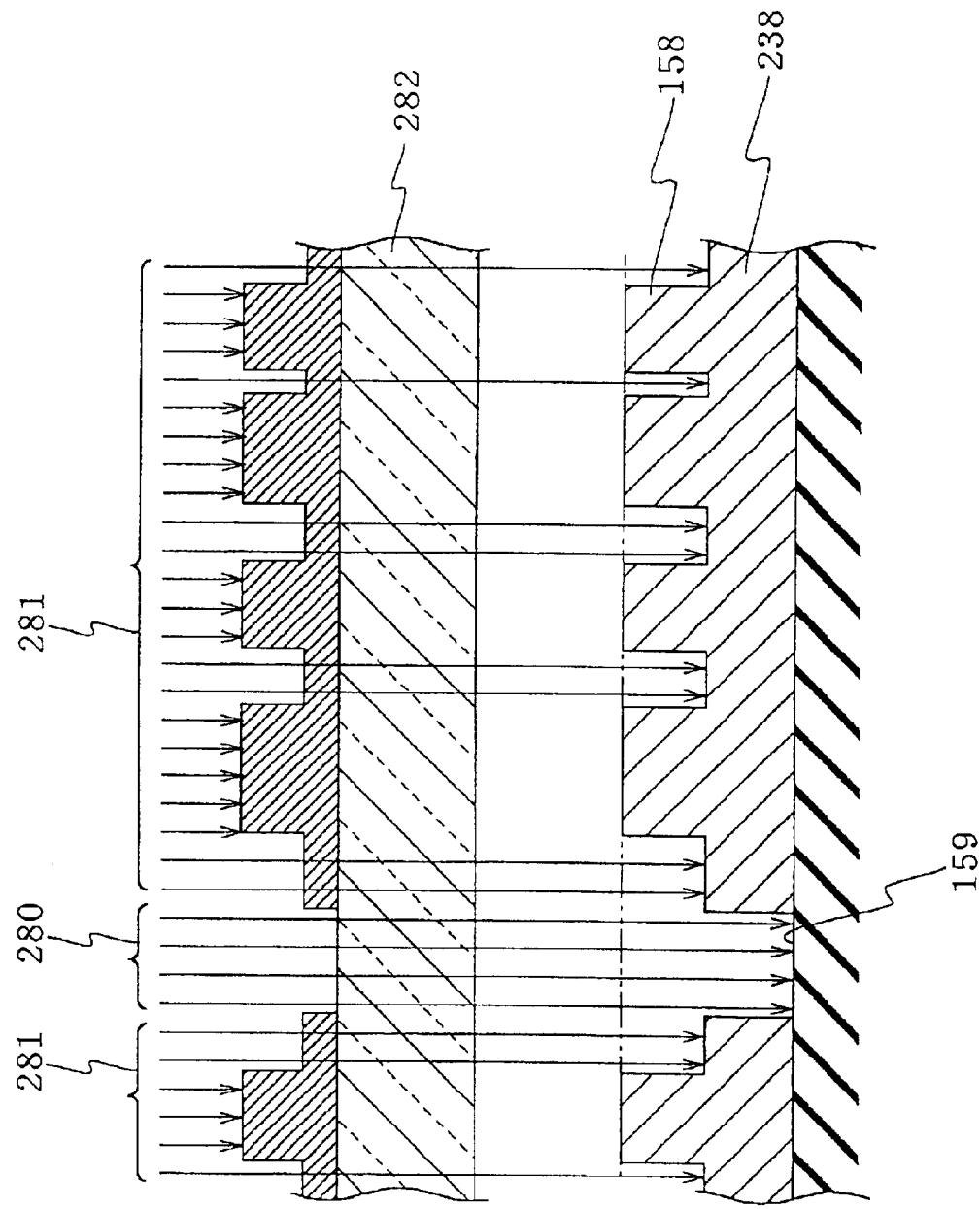
FIG. 34 is a cross sectional view showing Example 5 of the reflective LCD apparatus production method according to the present invention.

FIG. 27 is a cross sectional view of the reflective LCD apparatus produced in this example. The reflective LCD apparatus includes a resist convex/concave pattern 239, a contact 241, a reflection plate 243, an opposing substrate 250, a glass substrate 251, a color filter 252, a transparent electrode 253, and a guest-host liquid crystal 254. A reference numeral 15 denotes an incident light and 16, a reflected light.

In the reflective LCD apparatus of this example, like in Example 1, no process damage is given to the switching element, enabling to obtain a preferable element characteristic and a desired convex/concave reflection plate structure. As a result, the color reflective panel produced in this example had a bright high-quality display.

Example 3

In this example, the convex/concave surface under the reflective electrode has a smooth convex/concave configuration. FIG. 28 and FIG. 29 are cross sectional views of the reflective LCD apparatus produced in this example.

This example is identical to Example 1 and Example 2 except for that an additional step is performed for converting the protrusions/indentations under the reflection electrode into a smooth shape. More specifically, a step for applying a thermal treatment is added after the step [i] in Example 1 and after the step [h] in Example 2. Accordingly, FIG. 28 is identical to FIG. 25.

In this example, the thermal treatment after the formation of the protrusions/indentations was performed in an oven under a nitrogen atmosphere at 260 degrees C. for 1 hour. By this thermal treatment, the inclination angle of the protrusions/indentations was changed from a range 60 to 80 degrees to a range 10 to 40 degrees. That is, the convex/concave shape was changed from a rectangular shape to a smooth sinusoidal curve surface 261. It should be noted that in the reflective LCD apparatus of this example, the average value of the protrusions/indentations inclination angle was set to about 8 degrees. Moreover, the protrusion/indentation inclination angle can be controlled by changing the bake temperature in the aforementioned thermal treatment step.

Moreover, in this example, the height of the protrusions was set to 1 micrometer like in Examples 1 and 2. It should be noted that by making the protrusion height higher, it is possible to obtain a reflection plate having an optical characteristic showing a higher scattering degree. This reduces the dependency of luminance on the field of view and enables to provide a reflective LCD apparatus that can easily be viewed. This advantage is especially great when the reflective LCD apparatus has a large-size screen.

Moreover, by reducing the height of the protrusions, it is possible to obtain a strong directivity as the optical characteristic of the reflection plate. In this case, by applying the present invention to a reflective LCD apparatus for a portable information apparatus having a comparatively small screen size, it is possible to realize a brighter display characteristic. Thus, it is possible to control the convex/concave structure according to the application or the panel display area.

Moreover, the insulation layer in this example is located between the reflection plate located above and the switching element located below, thereby serving as a protection film for the switching element.

Example 4

In this example, the insulation layer under the reflection plate is made by an organic insulation film having photosensitivity. FIG. 30 and FIG. 31 are cross sectional views of a reflective LCD apparatus produced in this example.

The production procedure for producing a reflective LCD apparatus in this example is identical to Example 1 or 2 except for that a photosensitive resin (photosensitive acrylic resin in this example) is used for the insulation layer under the reflection plate. More specifically, a photosensitive film 270 is used for the insulation layer formed in step [f] of Example 1 and step [g] of Example 2.

Thus, the convex/concave structure is formed by a step for forming the photosensitive film, a step of direct exposure to the photosensitive film, an etching-development step, and a melt step by thermal treatment. Accordingly, as compared to the convex/concave structure formation performed in Examples 1, 2, and 3, there is no need of the resist application step, the resist development step, and the resist peel-off step. Thus, the production procedure is simplified.

In this example, a photosensitive acrylic resin is used as the photosensitive material. However, the photosensitive material is not to be limited to this. It is also possible to use a photosensitive organic resin or a photosensitive inorganic film to obtain the same effect. It should be noted that the similar convex/concave insulation layer was obtained by using as the photosensitive material, "OFPR800" (trade name) produced by Tokyo Oyo-kagaku Kogyo Co., Ltd., "LC100" (trade name) produced by Sipray Co., Ltd., "Optomer series" (trade name) produced by Nihon Synthetic Rubber Co., Ltd., and "Photosensitive Polyimide" (trade name) produced by Nihon Kagaku Kogyo co., Ltd.

Example 5

FIG. 32 and FIG. 33 show production steps for producing a reflective LCD apparatus used in this example. As the switching element, a thin film transistor of inverse stagger structure was used.

The production is performed on the glass substrate 230 as follows.

[a] formation of a Cr film of 50 nm thickness by sputtering

[b] formation of a gate electrode 231 (1st photoresist)

[c] formation of a gate insulation film 234 of 400 nm thickness, a semiconductor layer 233 of 100 nm thickness, and a doping layer 234 of 100 nm thickness by the plasma CVD

[d] formation of an island 235 (2nd photoresist)

[e] formation of a Cr layer of 50 nm thickness and an ITO layer of 50 nm thickness by sputtering

[f] formation of a source electrode 237, a drain electrode 236 and an electrode 130 for formation of the convex/concave structure (3rd photoresist)

[g] formation of a photosensitive acrylic resin 270 (3 micrometers)

[h] exposure of the convex/concave pattern and the contact pattern onto the phtoosensitive acrylic resin (4th photoresist)

[i] simultaneous formation of protrusions/indentations 239 and the contact 241 by development-etching

[j] formation of an aluminum film 242 of 300 nm thickness by sputtering

[k] formation of the reflection pixel electrode plate 243 (5th photoresist)

[l] taking out of a gate line terminal (6th photoresist)

After this, the opposing substrate was placed on, thus completing the reflective LCD apparatus. The reflective LCD apparatus realized a bright high-quality color display.

Example 5 is identical to Example 3 except for that in step [h] the convex/concave structure and the contact are simultaneously formed. Step [h] of Example 5 realizes step [i] in which the insulation film having a film thickness of 3 micrometers are removed completely in the contact region while a lower film of 2 micrometers is left in the convex/concave region.

More specifically, Example 5 uses a single mask having a contact pattern 280 and a convex/concave pattern 281. The mask material 282 is controlled in such a manner that more light pass through the contact pattern region than in the convex/concave pattern. Thus, in the exposed photosensitive acrylic resin 283, different radiation energies are applied to the respective patterns. Accordingly, with the same development time, it is possible to simultaneously obtain different etching amounts, i.e., a region having a desired film thickness and a region having no film.

In this example, the light transmission ratio was controlled to be 3:1 in the contact pattern region and in the convex/concave pattern region. In the development step, "NMD-3" (trade name, produced by Tokyo Oyo-kagaku Kogyo Co., Ltd.) was used and the development time was set to 90 seconds. As a result, the film was completely removed in the contact region and a lower layer film of 2 micrometers was left in the convex/concave region.

In this example using a photosensitive material for the insulation film and simultaneously forming the convex/concave pattern and the contact pattern, it is possible to reduce the production steps of the TFT substrate of the reflective LCD apparatus. Moreover, the application of photoresist is also reduced from 8 times to 6 times during the production of the TFT substrate. This enables to provide a reflective LCD apparatus at a reduced cost.

In this example, the exposure amount was controlled by controlling the transmission amount of the mask material in the mask for simultaneously forming the convex/concave pattern and the contact pattern. It is also possible to use a convex/concave pattern mask and a contact pattern mask and perform exposure twice. In this case, it is necessary to set the exposure amount for the contact pattern greater than the exposure amount for the convex/concave pattern.

Example 6

Figure 35:
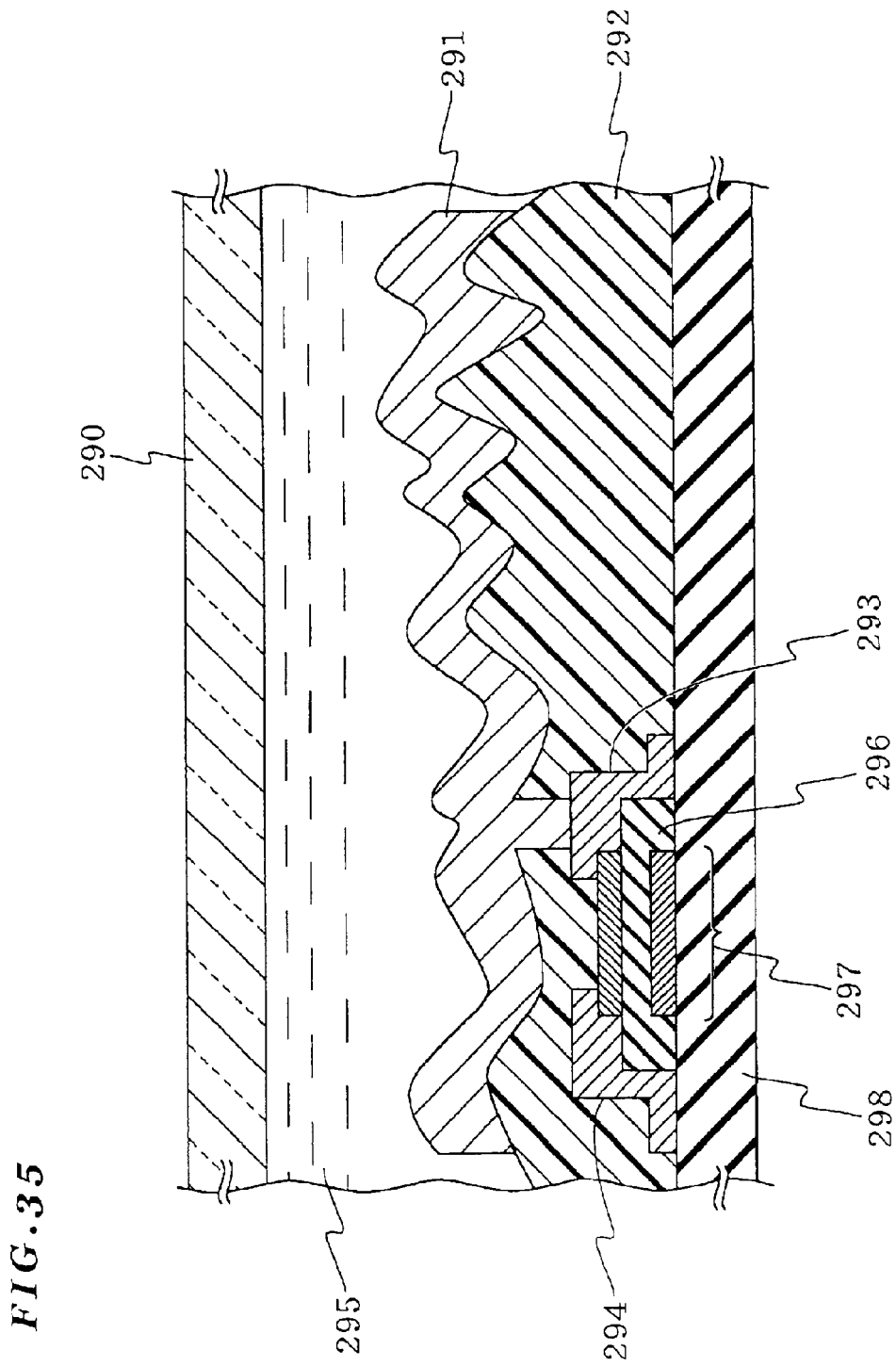
FIG. 35 is a cross sectional view showing a reflective LCD apparatus according to Example 6 of the present invention.
Figure 36:
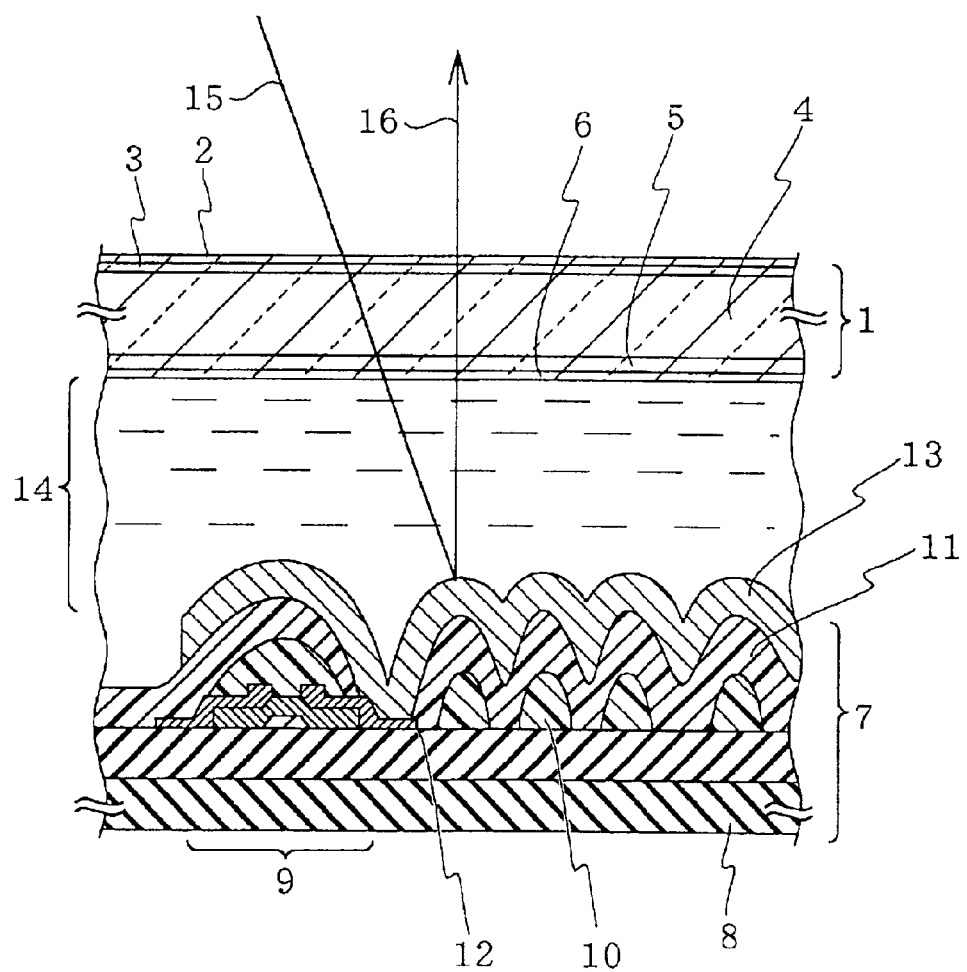
FIG. 36 is a cross sectional view showing a conventional reflective LCD apparatus.
Figure 37A:
FIG. 37 shows a conventional reflective LCD apparatus production procedure in cross sectional views: steps shown in FIG. 37[a] to FIG. 37[f] are successively performed in this order.
Figure 37B:
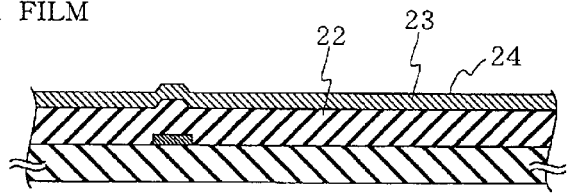
Figure 37C:
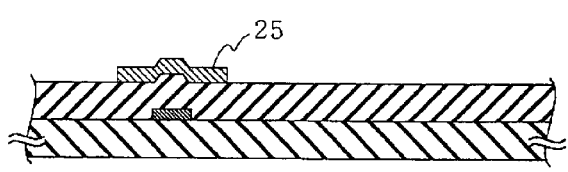
Figure 37D:
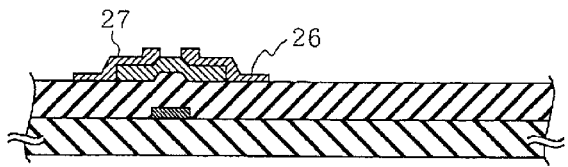
Figure 37E:
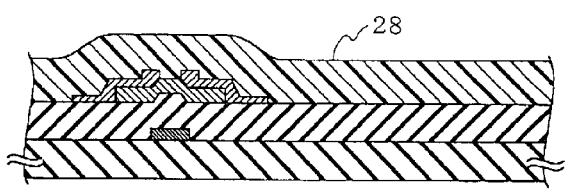
Figure 37F:
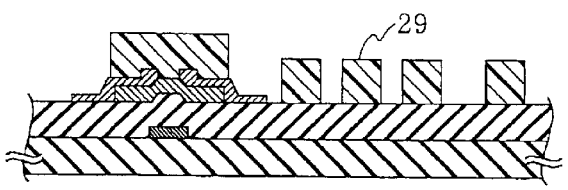
Figure 38G:
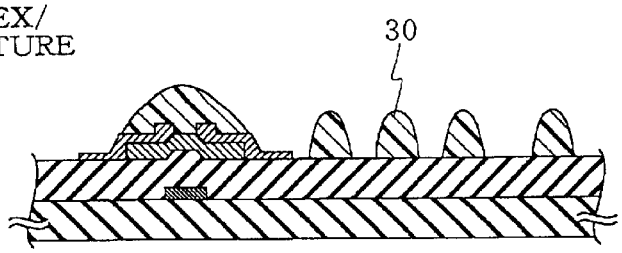
FIG. 38 shows a conventional reflective LCD apparatus production procedure in cross sectional views: steps shown in FIG. 38[g] to FIG. 38[j] are successively performed in this order.
Figure 38H:
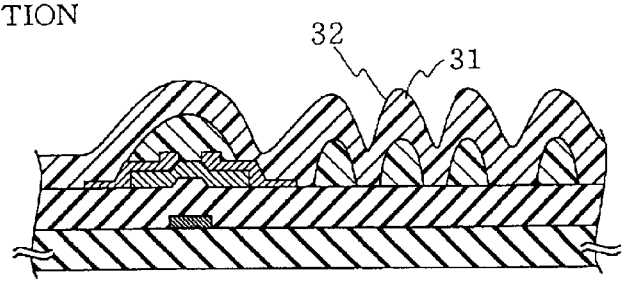
Figure 38I:
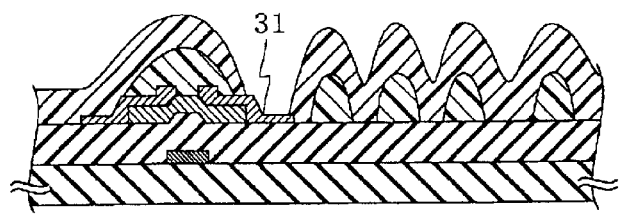
Figure 38J:
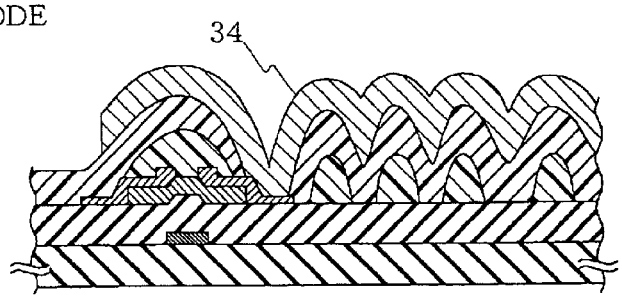

FIG. 35 is a cross sectional view of a reflective LCD apparatus used in this example. The reflective LCD apparatus includes an opposing substrate 290, a concave/convex reflection plate 291, a convex/concave layer 292, a pixel electrode 293, a signal line 294, a liquid crystal layer 295, an insulation layer 296, and an MIM element 297.

The switching element is an MIM diode element having a metal-insulation film-metal structure. In this case also, it was possible to obtain a preferable display performance in the same way when a thin film transistor is used as the switching element.

It should be noted that in the aforementioned figures, like components are denoted by like reference symbols and their explanations are omitted.

According to the reflective LCD apparatus and production method thereof according to the present invention, the insulation film having a convex/concave structure under the reflection electrode protects the switching element during a production; and the irregular arrangement of regions having different film thickness values enables to suppress interference of a reflected light from the reflection electrode, thereby enabling to prevent deterioration of characteristic of the switching element during the production. Moreover, since no other film is required for the convex/concave structure, it is possible to reduce the number of the production steps.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-006423 (Filed on January 14, 2000) including specification, claims, drawings and summary are incorporated herein by reference in its entirety.

What is claimed is:

1. A reflective liquid crystal display (LCD) apparatus comprising:
a transparent first substrate;
a transparent electrode arranged on the first substrate;
a second substrate;
a switching element arranged on the second substrate;
an insulation film arranged on the switching element and having a convex/concave structure;
a reflection electrode arranged on the insulating film along the convex/concave structure and connected to the switching element; and
a liquid crystal layer sandwiched between the transparent electrode of the first substrate and the reflection electrode of the second substrate; wherein
the insulation film protects the switching element;
the convex/concave structure is formed by irregular arrangement of regions having different thickness values; and
at least one portion of the insulation film is a single material that extends laterally along the second substrate under the entirety of at least two adjacent convex portions of the convex/concave structure,
the at least one portion of the insulation film has, along its length, a generally constant thickness extending at least from an uppermost surface of an insulation layer of the switching element to a lowermost surface of a concave portion of the convex/concave structure located between the at least two adjacent convex portions; and
the at least two adjacent convex portions of the convex/concave structure are formed in a continuous line shape.

2. The reflective LCD apparatus as claimed in claim 1, wherein the convex/concave structure has a continuous smooth shape.

3. The reflective LCD apparatus as claimed in claim 1, wherein the insulation film is a single-layered film made from a single material.

4. The reflective LCD apparatus as claimed in claim 1, wherein the insulation film has a light absorption characteristic.

5. The reflective LCD apparatus as claimed in claim 1, wherein the convex/concave structure has a plurality of protrusions arranged irregularly.

6. The reflective LCD apparatus as claimed in claim 5, wherein the protrusions have an island shape or a line shape in a plan view.

7. The reflective LCD apparatus as claimed in claim 1, wherein the convex/concave structure has a plurality of indentations arranged irregularly.

8. The reflective LCD apparatus as claimed in claim 7, wherein the indentations have a hole shape or a line shape in a plan view.

9. The reflective LCD apparatus as claimed in claim 1, wherein the convex/concave structure is formed by repetition of an irregular convex/concave shape based on one or more than one pixels.

10. The reflective LCD apparatus as claimed in claim 1, wherein the insulation film is made from an organic resin or inorganic resin having photosensitivity.

11. The reflective LCD apparatus as claimed in claim 1, wherein said at least one portion of said insulation film also comprises a portion that extends to be arranged on top of said switching element.

12. A liquid crystal display (LCD) apparatus comprising:
a pair of a first substrate and a second substrate, each of which is transparent and is separately arranged so as to have a predetermined distance between each other;
a transparent electrode arranged on the first substrate;
a switching element arranged on the second substrate;
an insulation film which is arranged on the second substrate in a continuous face shape and arranged on an upper part of the switching element so as to protect the switching element by overlaying the same, having a convex/concave structure on a surface facing the first substrate;
a reflection electrode which is arranged on the insulation film and a surface of which, facing the first substrate, has a shape reflecting the convex/concave structure of the insulation film; and a liquid crystal layer filled in a space between the transparent electrode of the first substrate and the reflection electrode of the second substrate, wherein
at least one portion of the insulation film is a single material that extends laterally along the second substrate under the entirety of at least two adjacent convex portions of the convex/concave structure,
the at least one portion of the insulation film has, along its length, a generally constant thickness extending at least from an uppermost surface of an insulation layer of the switching element to a lowermost surface of a concave portion of the convex/concave structure located between the at least two adjacent convex portions; and
the at least two adjacent convex portions of the convex/concave structure are formed in a continuous line shape.

13. The LCD apparatus as claimed in claim 12, wherein the insulation film is a single layer structure and has the convex/concave structure formed as a part of the surface, facing the first substrate, of the insulation film.

14. The LCD apparatus as claimed in claim 13, wherein a protrusion of the convex/concave structure is a continuous smooth shape.

15. The LCD apparatus as claimed in claim 13, wherein the insulation film has a light absorption characteristic.

16. The LCD apparatus as claimed in claim 13, wherein a plurality of protrusions of the convex/concave structure and a plurality of indentations indented downward from the protrusions are arranged irregularly.

17. The LCD apparatus as claimed in claim 16 wherein the protrusions have a pattern of an island-shape or a line shape.

18. The LCD apparatus as claimed in claim 16, wherein the indentations have a pattern of a hole shape or a line shape.

19. The LCD apparatus as claimed in claim 16, wherein the convex/concave structure is formed by an irregular arrangement of the convex/concave shape based on one pixel or more than one pixels as a unit.

20. The LCD apparatus as claimed in claim 13, wherein the insulation film, is made from an organic resin or inorganic resin having photosensitivity.

21. The LCD apparatus as claimed in claim 12, wherein the insulation film is a single layer structure and has the convex/concave structure formed separately on the surface, facing the first substrate, of the insulation film.

22. The LCD apparatus as claimed in claim 21, wherein the insulation film has a light absorption characteristic.

23. The LCD apparatus as claimed in claim 21, wherein a plurality of protrusions of the convex/concave structure and a plurality of indentations indented downward from the protrusions are arranged irregularly.

24. The LCD apparatus as claimed in claim 21, wherein the protrusions have a pattern of an island shape or a line shape.

25. The LCD apparatus as claimed in claim 21, wherein the indentations have a pattern of a hole shape or a line shape.

26. The LCD apparatus as claimed in claim 21, wherein the convex/concave structure is formed by an irregular arrangement of the convex/concave shape based on one pixel or more than one pixels as a unit.

27. The LCD apparatus as claimed in claim 21, wherein the insulation film is made from an organic resin or inorganic resin having photosensitivity.

28. The LCD apparatus as claimed in claim 21, wherein the insulation film is formed of a transparent photosensitive material where a back light is able to pass through.

29. The liquid crystal display (LCD) apparatus as claimed in claim 12, wherein said at least one portion of said insulation film also comprises a portion that extends to be arranged on top of said switching element.

30. A reflective liquid crystal display (LCD) apparatus comprising:
a transparent first substrate;
a transparent electrode arranged on the first substrate;
a second substrate;
a switching element arranged on the second substrate;
an insulation film arranged on the switching element and having a convex/concave structure;
a reflection electrode arranged on the insulating film along the convex/concave structure and connected to the switching element; and
a liquid crystal layer sandwiched between the transparent electrode of the first substrate and the reflection electrode of the second substrate; wherein
the insulation film protects the switching element;
the convex/concave structure is formed by irregular arrangement of regions having different thickness values;
the insulation film is a single-layered film made from a single material; and
a convex portion of the convex/concave structure is formed in a continuous line shape.

31. A liquid crystal display (LCD) apparatus comprising:
a pair of a first substrate and a second substrate, each of which is transparent and is separately arranged so as to have a predetermined distance between each other;
a transparent electrode arranged on the first substrate;
a switching element arranged on the second substrate;
an insulation film which is arranged on the second substrate in a continuous face shape and arranged on an upper part of the switching element so as to protect the switching element by overlaying the same, and has a convex/concave structure on a surface facing the first substrate;
a reflection electrode which is arranged on the insulation film and a surface of which, facing the first substrate, has a shape reflecting the convex/concave structure of the insulation film; and
a liquid crystal layer filled in a space between the transparent electrode of the first substrate and the reflection electrode of the second substrate,
wherein the insulation film is a single layer structure and has the convex/concave structure formed as a part of the surface, facing the first substrate, of the insulation film; and
a convex portion of the convex/concave structure is formed in a continuous line shape.

32. A reflective liquid crystal display (LCD) apparatus comprising:
a transparent first substrate;
a transparent electrode arranged on the first substrate;
a second substrate;
a switching element arranged on the second substrate;
an insulation film arranged on the switching element and having a convex/concave structure;
a reflection electrode arranged on the insulating film along the convex/concave structure and connected to the switching element; and
a liquid crystal layer sandwiched between the transparent electrode of the first substrate and the reflection electrode of the second substrate; wherein the insulation film protects the switching element;

the convex/concave structure is formed by irregular arrangement of regions having different thickness values;

the entire insulation film between said reflection electrode and said second substrate is a single-layered film made from a single material arranged in one step; and a convex portion of the convex/concave structure is formed in a continuous line shape.

33. A liquid crystal display (LCD) apparatus comprising:

a pair of a first substrate and a second substrate, each of which is transparent and is separately arranged so as to have a predetermined distance between each other, a transparent electrode arranged on the first substrate;

a switching element arranged on the second substrate;

an insulation film which is arranged on the second substrate in a continuous face shape and arranged on an upper part of the switching element so as to protect the switching element by overlaying the same, and has a convex/concave structure on a surface facing the first substrate;

a reflection electrode which is arranged on the insulation film and a surface of which, facing the first substrate, has a shape reflecting the convex/concave structure of the insulation film; and a liquid crystal layer filled in a space between the transparent electrode of the first substrate and the reflection electrode of the second substrate, wherein the entire insulation film between said reflection electrode and said second substrate is made from a single material arranged in a single step and has the convex/concave structure formed as a part of the surface, facing the first substrate, of the insulation film; and a convex portion of the convex/concave structure is formed in a continuous line shape.

* * * * *